(12) United States Patent
Rhodes et al.

(10) Patent No.: US 7,911,465 B2
(45) Date of Patent: Mar. 22, 2011

(54) TECHNIQUES FOR DISPLAYING INFORMATION FOR COLLECTION HIERARCHIES

(75) Inventors: Bradley Rhodes, Mountain View, CA (US); Kurt Piersol, Campbell, CA (US); Gregory J. Wolff, Palo Alto, CA (US)

(73) Assignee: Ricoh Company, Ltd., Tokyo (JP)

( * ) Notice: Subject to any disclaimer, the term of this patent is extended or adjusted under 35 U.S.C. 154(b) by 881 days.

(21) Appl. No.: 11/694,030

(22) Filed: Mar. 30, 2007

(65) Prior Publication Data

US 2008/0238922 A1 Oct. 2, 2008

(51) Int. Cl.
*G06T 11/20* (2006.01)
(52) U.S. Cl. ........................................ 345/440; 701/200
(58) Field of Classification Search .................. 345/440; 701/200
See application file for complete search history.

(56) References Cited

U.S. PATENT DOCUMENTS

| | | | |
|---|---|---|---|
| 5,812,862 A | 9/1998 | Smith et al. | |
| 5,987,469 A | 11/1999 | Lewis et al. | |
| 6,202,061 B1 * | 3/2001 | Khosla et al. | 707/3 |
| 6,359,635 B1 | 3/2002 | Perttunen | |
| 6,724,403 B1 * | 4/2004 | Santoro et al. | 715/765 |
| 6,765,597 B2 | 7/2004 | Barksdale et al. | |
| 6,833,848 B1 * | 12/2004 | Wolff et al. | 715/719 |
| 7,028,264 B2 * | 4/2006 | Santoro et al. | 715/765 |
| 7,051,291 B2 * | 5/2006 | Sciammarella et al. | 715/838 |
| 7,275,063 B2 * | 9/2007 | Horn | 707/102 |
| 7,325,198 B2 * | 1/2008 | Adcock et al. | 715/722 |
| 7,376,907 B2 * | 5/2008 | Santoro et al. | 715/765 |
| 7,383,503 B2 * | 6/2008 | Banks | 715/273 |
| 7,542,994 B2 * | 6/2009 | Anderson | 707/104.1 |
| 7,581,195 B2 * | 8/2009 | Sciammarella et al. | 715/838 |
| 7,616,777 B2 * | 11/2009 | Rodriguez et al. | 382/100 |
| 2004/0230843 A1 * | 11/2004 | Jansen | 713/202 |
| 2004/0263513 A1 | 12/2004 | Smith | |
| 2005/0138570 A1 | 6/2005 | Good et al. | |
| 2007/0162953 A1 * | 7/2007 | Bolliger et al. | 725/142 |
| 2007/0274611 A1 * | 11/2007 | Rodriguez et al. | 382/317 |
| 2008/0052372 A1 * | 2/2008 | Weber et al. | 709/217 |

OTHER PUBLICATIONS

Marshall et al., "VIKI: Spatial Hypertext Supporting Emergent Structure," in Conference on Hypetext and Hypermedia: Proceedings of the 1994 ACM European Conference on Hypermedia Technology, pp. 13-23, (1994) (11 pages).
Chapter 16, "Frames, HTML 4.01 Specification: W3C Recommendation," (Dec. 24, 1999) (13 pages).
Kustanowitz et al., "Bi-level Hierarchical Layouts for Photo Libraries: Algorithms for Design Optimization with Quantum Content," (12 pages).
Robertson et al., "Data Mountain: Using Spatial Memory for Document Management," UIST '98, pp. 153-162, (1998) (10 pages).
Faichney et al., "Goldleaf Hierarchical Document Browser," In *User Interface Conference*, 2001. AUIC 2001. Proceedings. Second Australasian, Volume, Issue, pp. 13-20 Digital Object Identifier 10.1109/AUIC.2001.906271 (2001) (8 pages).

(Continued)

*Primary Examiner* — Javid A Amini
(74) *Attorney, Agent, or Firm* — Townsend and Townsend and Crew LLP

(57) ABSTRACT

Techniques for displaying information related to collection hierarchies. In one embodiment, an integrated direct-manipulation image-based interface is provided for displaying information related to collections. The interface also enables operations to be performed on collections and their elements. Multiple levels of the collection hierarchy are made visible and editable at the same time by the user interface.

30 Claims, 13 Drawing Sheets

OTHER PUBLICATIONS

Perlin et al., "Nested User Interface Components," NYU Media Research Lab, *Proceedings of the 12th annual ACM symposium on User interface software and technology*, pp. 11-18, 1999. ISBN:1-58113-075 (8 pages).

Bederson, et al., "Pad++: A Zooming Graphical Interface for Exploring Alternate Interface Physics", ACM UIST '94, (1994) (10 pages).

Kustanowitz et al., "Meaningful Presentations of Photo Libraries: Rationale and Applications of Bi-Level Radial Quantum Layouts," JCDL '05, Jun. 7-11, 2005 (9 pages).

Bederson, "PhotoMesa: A Zoomable Image Browser Using Quantum Treemaps and Bubblemaps," UIST '01, Nov. 11-14, 2001, pp. 71-80, (10 pages).

Bederson, "*Quantum Treemaps and Bubblemaps for a Zoomable Image Browser*," Tech Report HCIL-2001-10, CS-TR-4256, UMIACS-TR-2001-39. Also published in ACM Conference on User Interface and Software Technology (UIST 2001) as PhotoMesa: A Zoomable Image Browser using Quantum Treemaps and Bubblemaps, pp. 71-80 (May 2001) (10 pages).

Chazard et al., "Using Treemaps to represent medical data," Studies in Health Technology and Informatics, Jan. 1, 2006, pp. 522-527, vol. 124, XP002600391.

European Search Report for Application No. EP08251191.6, dated Sep. 27, 2010, 9 pages.

* cited by examiner

TECHNIQUES FOR DISPLAYING INFORMATION FOR COLLECTION HIERARCHIES

BACKGROUND OF THE INVENTION

The present invention relates to visualization of information and more particularly to techniques for displaying information related to collection hierarchies.

The concept of collections is integral to several fields. For example, collections are commonly used to show containment relationship. A collection may comprise several elements, one or more of which may themselves be collections, and so on. There may be several levels to a collection hierarchy with a collection comprising a subcollection, the subcollection comprising another collection, and so on. Improved techniques are desired for depicting information related to collections.

BRIEF SUMMARY OF THE INVENTION

Embodiments of the present invention provide techniques for displaying information related to collection hierarchies. In one embodiment, an integrated direct-manipulation image-based interface is provided for displaying information related to collections. The interface also enables operations to be performed on collections and their elements. Multiple levels of the collection hierarchy are made visible and editable at the same time by the user interface.

According to an embodiment of the present invention, techniques are provided for displaying information related to collections. In one embodiment, a graphical object representative of a collection is displayed. The graphical object representing the collection has a bounds associated with it that defines an area of a certain shape and size and a grid of tiled cells on a 2-dimensional plane, wherein each element in the collection is associated with one or more cells of the grid. The cells of the grid may be of the same shape and size or of different shapes and sizes. A graphical object is displayed for each element in the collection such that the graphical object for an element is displayed based upon the one or more cells of the grid associated with the element represented by the graphical object. Displaying of graphical objects for the elements in the collection comprises scaling and positioning the grid such that all graphical objects representing the elements of the collection are displayed within the area defined by the bounds of the graphical object representing the collection.

In one embodiment, the grid of the graphical object representing the collection may be positioned such that a centroid of a span of cells of the grid associated with the elements of a collection is the same as a centroid of the graphical object representing the collection. Scaling the grid may comprise scaling the grid such that all graphical objects representing the elements of the collection are displayed as large as possible.

In one embodiment, a first and a second bounds may be associated with the graphical object representing a collection. The area defined by the second bounds may be such that it is within the area defined by the first bounds of the graphical object representing the collection. The graphical objects representing the elements of the collection may be displayed within the second bounds of the graphical object representing the collection.

The elements of a collection may be a non-collection element or a collection element. Multiple levels of a collection hierarchy may exist. For example, a collection may comprise an element that is another collection which in turn may comprise one or more elements that are collections, and so on. The user interface according to an embodiment of the present invention displays graphical objects depicting collections at the multiple levels and elements of the collections. At each level, graphical objects are displayed such that graphical objects representing elements within a collection are displayed within the bounds of a graphical object representing the collection.

In one embodiment, a cell of a grid associated with a graphical object representing a collection may be assigned or associated with at most one element of the collection. In other embodiments, a cell of the grid may be associated with multiple elements of the collection.

According to an embodiment of the present invention, when displaying a graphical object representing a collection and graphical objects for elements of the collection, the grid associated with the graphical object representing the collection may be iteratively scaled and positioned such that all the cells of the grid that are associated with the elements of the collection are positioned within the graphical object representing the collection. As part of displaying the graphical objects for the elements of a collection, for at least one element from the collection, a set of cells of the grid associated with the collection graphical object are determined that are associated with the at least one element. The graphical object representing the at least one element is then displayed in a position corresponding to the set of cells of the grid. A minimum bounding box may also be determined based upon the set of cells. The grid associated with a graphical object representing a collection may or may not be displayed.

According to an embodiment of the present invention, the graphical objects displayed for collections and their elements are individually selectable. One or more graphical objects may be selected at a time. One or more operations may be performed on the selected graphical objects. In one embodiment, the operation performed on a selected graphical object is performed on an element or collection represented by the selected graphical object.

Various different operations may be performed. In one embodiment, a new element may be added to a collection. This may cause the user interface and graphical objects displayed for the collection to be redisplayed. The grid associated with the graphical object representing the collection may be scaled and positioned such that all cells of the grid associated with the elements of the collection, including the new element, are positioned within the bounds of the graphical object representing the collection. Graphical objects representing the elements of the collection are redisplayed such that the graphical object for an element is displayed in a position corresponding to the one or more cells of the grid associated with the element and the graphical objects representing the elements of the collection are displayed within the bounds of the graphical object representing the collection.

In one embodiment, an element may be deleted from a collection and may cause the graphical objects for the collection and its elements to be redisplayed. The grid associated with the graphical object representing the collection may be scaled and positioned such that all cells of the grid associated with elements of the collection, excluding the deleted element, are positioned within the bounds of the graphical object representing the collection. Graphical objects representing the elements of the collection are redisplayed such that the graphical object for an element is displayed in a position corresponding to the one or more cells of the grid associated with the element and the graphical objects representing the elements of the collection are displayed within the bounds of the graphical object representing the collection.

In yet another embodiment, information may be received indicative of a change in size or position of a graphical object representing a first element in a collection. The grid associated with the graphical object representing the collection may be scaled and positioned such that all cells of the grid associated with elements of the collection, including the first element, are positioned within the bounds of the graphical object representing the collection. Graphical objects for elements in the collection may be redisplayed such that the graphical object for an element is displayed in a position corresponding to the one or more cells of the grid associated with the element and the graphical objects representing the elements of the collection are displayed within the bounds of the graphical object representing the collection.

The foregoing, together with other features, embodiments, and advantages of the present invention, will become more apparent when referring to the following specification, claims, and accompanying drawings.

DETAILED DESCRIPTION OF THE INVENTION

In the following description, for the purposes of explanation, specific details are set forth in order to provide a thorough understanding of the invention. However, it will be apparent that the invention may be practiced without these specific details.

Embodiments of the present invention provide techniques for displaying information related to collection hierarchies. In one embodiment, an integrated direct-manipulation image-based interface is provided for displaying information related to collections. The interface also enables operations to be performed on collections and their elements. Multiple levels of the collection hierarchy are made visible and editable at the same time by the user interface.

Figure 1:
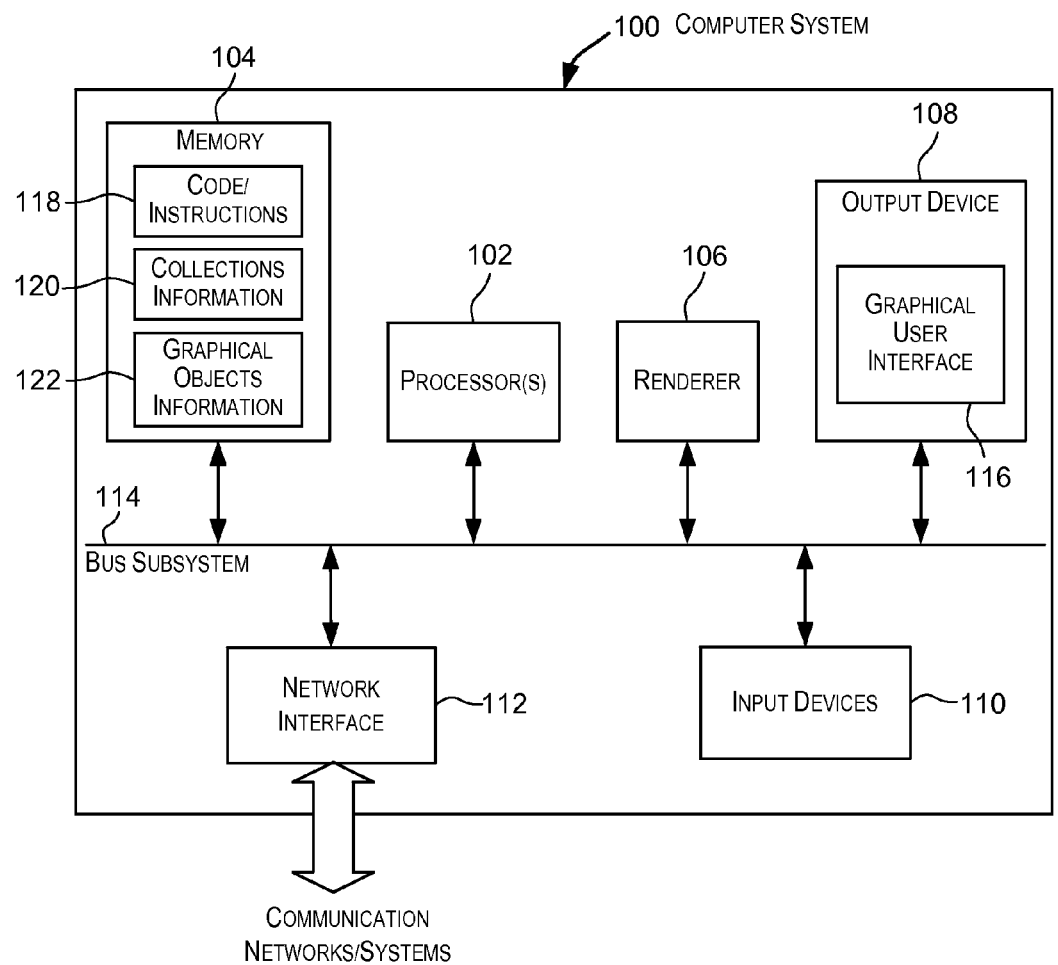
FIG. 1 is a simplified block diagram of a computer system that may incorporate an embodiment of the present invention.

FIG. 1 is a simplified block diagram of a computer system 100 that may incorporate an embodiment of the present invention. Computer system 100 depicted in FIG. 1 is merely illustrative of an embodiment incorporating the present invention and is not intended to limit the scope of the invention as recited in the claims. Embodiments of the present invention may be incorporated into various other systems and devices. One of ordinary skill in the art would recognize other variations, modifications, and alternatives.

As depicted in FIG. 1, computer system 100 comprises a processor 102, memory 104, renderer 106, one or more output devices 108, one or more input devices 110, and a network interface 112. The various components of computer system 100 communicate with each other using bus subsystem 114. While one bus subsystem is shown in the embodiment depicted in FIG. 1, alternative embodiments may utilize multiple bus subsystems.

Network interface 112 provides an interface to other computer systems and networks. Network interface 112 provides an interface for receiving data from other sources and for transmitting data to other sources from computer system 100. Embodiments of network interface 112 include an Ethernet card, a modem (telephone, satellite, cable, ISDN, etc.), (asynchronous) digital subscriber line (DSL) units, and the like.

Processor 102 is configured to perform processing for displaying collections information according to an embodiment of the present invention. For example, processor 102 may be configured to execute code modules or instructions 118 that cause the processor to perform processing to display information related to collections. The code modules or instructions 118 may be stored in memory 104. Processor 102 may also perform other functions performed by computer system 100. Processor 102 may also control the functioning of other subsystems of computer system 100.

Information 120 related to one or more collections may be stored in memory 104 (depicted as collections information 120). Processor 102 may use collections information 120 to draw graphical objects representing the collections according to the teachings of the present invention. Collections information 118 may also be stored in memory locations remote to computer system 100 such as on one or more systems or servers that can be accessed by computer system 100 using network interface 112. The collections information may also be stored on storage devices that are made accessible to computer system 100.

Collections information 120 comprises information related to one or more collections and the elements contained by the collections. A collection may contain zero or more elements. A collection with zero elements is an empty collection. An element of a collection may itself be another collection containing zero or more elements or a non-collection element. As a result, multiple levels of collections hierarchy may exist with a first collection comprising an element which is a collection, which in turn may comprise an element which is another collection, and so on. Examples of collections include a folder, a directory, a bag, a set, etc. An element of a collection may be a document (e.g., an image, a web page, an editable document), a media object (e.g., an audio clip), a link (e.g., a URL), and the like.

According to an embodiment of the present invention, collections are depicted using one or more graphical objects. A graphical object is displayed for a collection and for each element of the collection. The graphical objects representing the collection and its elements are displayed such that the graphical objects for the elements are displayed completely within the boundary of the graphical object representing the collection containing the elements. In this manner, the containment relationship between a collection and its elements is clearly visually displayed to a user.

Multiple levels of a collection hierarchy may be displayed using graphical objects. For example, consider a scenario where a first collection comprises an element that is another collection (a second collection) that in turn comprises one or more elements. In this scenario, a graphical object is displayed for the first collection. A graphical object is displayed for each element of the first collection, including the second collection, such that the graphical objects are displayed within the boundaries of the graphical object representing the first collection. Further, a graphical object is displayed for each element of the second collection in such a way that the graphical objects representing elements of the second collection are displayed within the boundaries of the graphical object representing the second collection. The graphical objects are displayed such that multiple levels of the collection hierarchy are visible at the same time. Further, in one embodiment, the graphical objects are drawn such that each of the graphical objects is individually selectable using an input device such as a mouse, trackball, touchpad, pen, etc. and any of the graphical objects may be selected at a time. Operations may be performed using the selected graphical objects. Performing an operation on a graphical object translates to performing the operation on the collection or element, which may be a collection or a non-collection, represented by the graphical object. In this manner, an integrated direct-manipulation image-based interface is provided for displaying and manipulating collections and their elements.

Information 122 stored in memory 104 relates to graphical objects and associated information that is used to display the collections hierarchy. Information 122 may also be stored in other memory locations accessible to computer system 100 such as on one or more systems or servers that are remote from computer 100 and that can be accessed by computer system 100 using network interface 112. Processor 102 may use information 122 to display the collections information. Information 122 may comprise information related to the size and shape of the graphical objects, colors or patterns to be used for displaying the objects, and other attributes associated with the graphical objects.

Renderer 106 is configured to render or draw the graphical objects representing collections and their elements on a display. Renderer 106 may receive information from processor 102 and use the information to draw graphical objects for collections and their elements at multiple levels of hierarchy. In one embodiment, renderer 106 may be a special purpose graphics processing unit (GPU) such as GPUs provided by ATI™, NVIDIA™, or the like. In the embodiment depicted in FIG. 1, renderer 106 is provided in addition to a processor 102 and may work in conjunction with processor 102 to perform the graphics processing. In alternative embodiments, renderer 106 may be part of processor 102 or processor 106 may be configured to perform the processing performed by renderer 106.

Computer system 100 may comprise one or more output devices 108. Output devices 108 may include a visual output device such as a screen or monitor or projector that displays the collections information according to an embodiment of the present invention. For example, graphical objects representing a collection and its elements may be displayed on a screen or monitor.

Input devices 110 enable a user of system 100 to interact with and provide information to system 100. Input devices 110 may include wired or wireless devices such as a keyboard, pointing devices such as a mouse, trackball, touchpad, or graphics tablet, a scanner, a touchscreen incorporated into the display, audio input devices such as voice recognition systems, microphones, and other types of input devices. In general, an input device may refer to any device or mechanism that may be used for inputting information to system 100. A user may use an input device such as a mouse, trackball, touchpad, pen, etc. to select and manipulate one or more of the graphical objects depicting collections or non-collections displayed on an output device.

Memory 104 provides a repository for storing the programming and data constructs that provide the functionality of the present invention. For example, a computer program or software code modules (or instructions) 118 implementing the functionality of the present invention may be stored in memory 104. These modules/instructions may be executed by processor 102. Memory 104 may also provide a repository for storing data used in accordance with the present invention such as collections information 120 and graphical objects information 122. In one embodiment, memory 104 may also store rendered images of graphical objects that may be displayed via a display device.

Memory 104 may include a number of memories including a main random access memory (RAM) for storage of instructions and data during program execution and a read only memory (ROM) in which fixed instructions are stored. Memory 104 may also comprise subsystems that provide persistent (non-volatile) storage and caching for program and data files, and may include a hard disk drive, a floppy disk drive along with associated removable media, a Compact Disk Read Only Memory (CD-ROM) drive, an optical drive such as a DVD, removable media cartridges, flash memory, and other like storage media.

Computer system 100 can be of various types including a personal computer, a portable computer, a workstation, a network computer, a mainframe, a kiosk, a photocopier, a printer, a multi-function printer (MFP), or any other data processing system. Due to the ever-changing nature of computers and networks, the description of system 100 depicted in FIG. 1 is intended only as a specific example for purposes of illustrating the preferred embodiment of a processing system. Many other configurations having more or fewer components than the system depicted in FIG. 1 are possible.

Figure 2A:
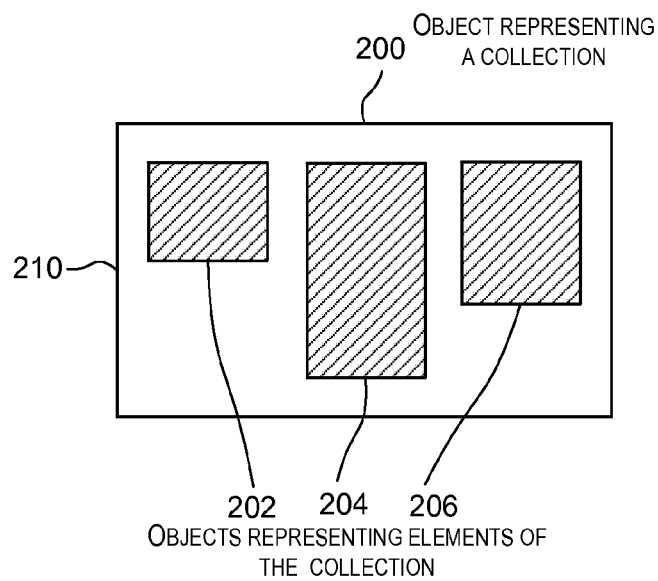
FIGS. 2A, 2B, and 2C depict examples in which collection information is displayed according to an embodiment of the present invention.
Figure 2B:
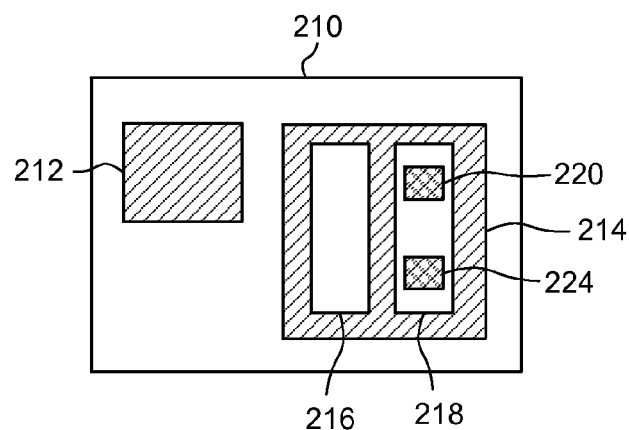
Figure 2C:
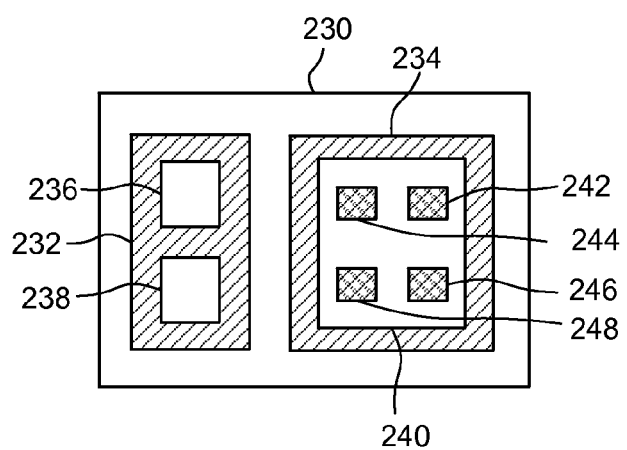

FIGS. 2A, 2B, and 2C depict examples in which collection information is displayed according to an embodiment of the present invention. The information may be displayed on an output device such as a screen or monitor. FIG. 2A displays information for a collection that contains three non-collection elements. As depicted in FIG. 2A, graphical objects are displayed representing the collection and its elements. A graphical object 200 is displayed representing the collection. Graphical objects 202, 204, and 206 are displayed representing elements of the collection. As depicted in FIG. 2A, graphical objects 202, 204, and 206 representing the elements are displayed within the boundary 210 of graphical object 200 representing the collection thereby visually depicting that the elements represented by graphical objects 202, 204, and 206 are contained within the collection represented by graphical object 200. Each of the graphical objects depicted in FIG. 2A are individually selectable for performing operations.

The example depicted in FIG. 2B assumes a hierarchy of collections. A graphical object 210 is displayed representing a first collection. The first collection contains two elements. Graphical objects 212 and 214 representing the elements of the first collection are displayed within the boundaries of graphical object 210 representing the first collection. One of the elements (represented by graphical object 214) of the first collection is also a collection (a second collection) comprising two elements. Graphical objects 216 and 218 are displayed representing the elements of the second collection. Graphical objects 216 and 218 are displayed within the boundaries of graphical object 214 representing the second collection. The element represented by graphical object 218 is also a collection (a third collection). Two graphical objects 220 and 224 are displayed representing the elements of the third collection. Graphical objects 220 and 224 are displayed within the boundaries of graphical object 218 representing the third collection.

The graphical objects displayed in FIG. 2B visually convey information that a first collection comprises two elements, one of the elements being a collection (second collection) comprising two elements, where one of the elements of the second collection is another collection (third collection) comprising two elements. In this manner, multiple levels of the collection hierarchy are displayed at the same time. The manner in which the graphical objects are displayed clearly visually indicates information regarding the containment relationship between the different elements and collections. Each of the graphical objects depicted in FIG. 2B is individually selectable using an input device such as a mouse, trackball, touchpad, pen, etc. Different techniques may be used for showing a selected graphical object such as emphasizing the border of the selected graphical object, changing the color of the selected graphical object, etc. One or more operations may be performed on a selected graphical object.

In the example depicted in FIG. 2C, a first collection comprises two elements, both of which are collections (a second collection and a third collection). The second collection comprises two elements. The third collection comprises one element which is a collection (a fourth collection). The fourth collection contains four elements. Graphical objects are displayed representing the collections and their elements. A graphical object 230 is displayed representing the first collection. Graphical objects 232 and 234 are displayed representing the elements of the first collection with graphical object 232 representing the second collection and graphical object 234 representing the third collection. Graphical objects 236 and 238 are displayed representing elements of the second collection. Graphical object 240 is displayed representing the element contained by the third collection. Graphical objects 242, 244, 246, and 248 are displayed representing elements contained by the fourth collection. In this manner, multiple levels of the collection hierarchy are displayed at the same time. The manner in which the graphical objects are displayed clearly identifies the containment relationship between the different elements and collections. Each of the graphical objects depicted in FIG. 2C is individually selectable for performing operations. For example, the displayed graphical objects may be selected using an input device such as a mouse, trackball, touchpad, pen, etc. Different techniques may be used for showing a selected graphical object such as emphasizing the border of the selected graphical object, changing the color of the selected graphical object, etc.

The graphical objects may be displayed in various different ways. In one embodiment, different colors may be used to display the graphical objects such that the containment relationship is clearly visible. Different shapes and sizes may be used for displaying the graphical objects. A graphical object for an element may also comprise a representation that visually identifies a characteristic of the element represented by the graphical object. For example, the graphical object may display information that identifies the contents of the element represented by the graphical object. For instance, in an embodiment where the elements are documents, a graphical object for a document may display a visual representation generated based upon the contents of the document.

In order to facilitate display of the collection hierarchy, graphical objects have attributes associated with them. As described above, a graphical object may be used to depict a collection or a non-collection. Accordingly, in one embodiment, the type of attributes associated with a graphical object may depend upon whether the graphical object is used to represent a collection or a non-collection. For example, the attributes associated with a graphical object used to depict a collection may include an outer bounds, an inner bounds, and a grid associated with a graphical object while the attributes associated with a graphical object used to depict a non-collection may not have an associated grid. In other embodiments, the attributes associated with a graphical object may be the same irrespective of whether the graphical object is used to depict a collection or a non-collection.

As previously stated, a graphical object may have an outer bounds attribute associated with it. The outer bounds of a graphical object is a boundary that defines the outer boundary or periphery of the graphical object. The outer bounds of a graphical object defines an area of the graphical object that is contained within the outer bounds of the graphical object. The outer bounds of a graphical object thus implicitly defines the size and shape of the graphical object.

The inner bounds of a graphical object is a boundary that is equal to or less than the outer bounds of the graphical object. The inner bounds of a graphical object may be the same as the outer bounds of the graphical object. Alternatively, the inner bounds of a graphical object may mark a boundary that is within the outer bounds of the graphical object. For example, the inner bounds for a graphical object may be determined by shrinking the outer bounds by a certain amount. In one embodiment, the inner bounds is calculated based upon the outer bounds of the graphical object by subtracting a value from the outer bounds. The value that is subtracted from the outer bounds to generate the inner bounds may be different in different dimensions and directions. For example, the subtracted value may be different in the horizontal and vertical dimensions. In general, the inner bounds of a graphical object defines an area of the graphical object that is within the area defined by the outer bounds of the graphical object.

A graphical object may have an associated grid of tiled cells on a 2-dimensional plane. A tiling is a collection of cells which do not overlap and which completely cover the 2-D area in question. In one embodiment, the tiling may be regular-shaped implying that all the cells of the grid are of the same shape and size. In alternative embodiments, the cells of a grid may have different shapes and/or sizes. Examples of a grid of tiled cells include a rectangular grid of polygons, a jigsaw puzzle, and others.

If a graphical object represents a collection, then each element of the collection is assigned or associated with one or more cells of the grid of the graphical object. In one embodiment, a cell of the grid may be associated with two or more different elements of the collection. In another embodiment, each cell of the grid may be associated with at most one element from the collection.

The association between elements of a collection and cells of a grid associated with a graphical object representing the collection is used for displaying graphical objects representing the elements of the collection. In one embodiment, when displaying a graphical object for an element of a collection, the graphical object for the element is displayed such that it occupies the one or more cells of the grid associated with the element represented by the graphical object. The grid of a graphical object representing the collection is positioned and scaled such that all the cells of the grid associated with one or more elements of the collection are located within the bounds (typically inner bounds) of the graphical object. In this manner, the graphical objects representing the elements of the collection, which are positioned in the cells associated with the corresponding elements, are also all displayed within the bounds of the graphical object representing the collection. Scaling may involve changing the size of the cells of the grid which may involve shrinking the cells or expanding the size of the cells. Positioning may involve translating the grid in one or more directions. The grid associated with a graphical object itself may or may not be displayed. Whether or not a grid is displayed may be user-configurable.

Figure 3A:
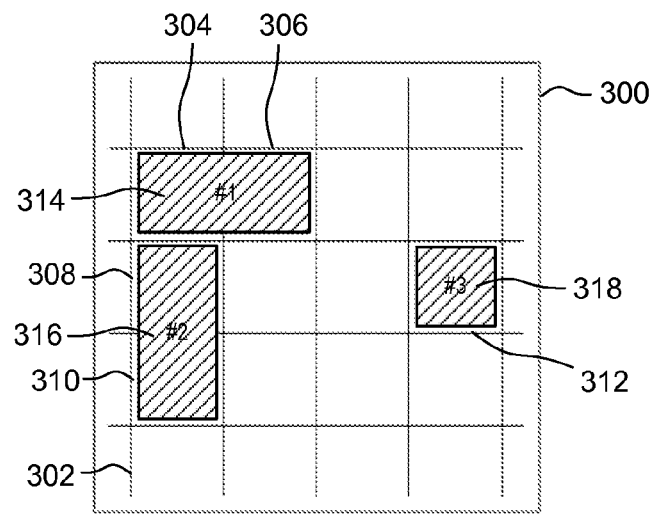
FIGS. 3A and 3B depict user interfaces displaying graphical objects along with a grid according to an embodiment of the present invention.

FIG. 3A depicts a user interface displaying graphical objects along with a grid according to an embodiment of the present invention. The example depicted in FIG. 3A assumes a collection comprising three elements, where the elements are not collections (i.e., are non-collections). A graphical object 300 is displayed representing the collection. A grid 302 associated with graphical object 300 is displayed. The example assumes that a first element of the collection is associated with cells 304 and 306 of grid 302, a second element of the collection is associated with cells 308 and 310 of grid 302, and the third element of the collection is associated with cell 312 of grid 302. Accordingly, as depicted in FIG. 3A, a graphical object 314 representing the first element is displayed in cells 304 and 306 that are associated with the first element, a graphical object 316 representing the second element is displayed in cells 308 and 310 that are associated with the second element, and a graphical object 318 representing the third element is displayed in cell 312 associated with the third element. In the process of rendering graphical objects 314, 316, and 318, grid 302 is scaled and positioned such that graphical objects 314, 316, and 318 are all completely displayed within the bounds of graphical object 300 representing the collection. The display of grid 302 may be turned on or off.

Figure 3B:
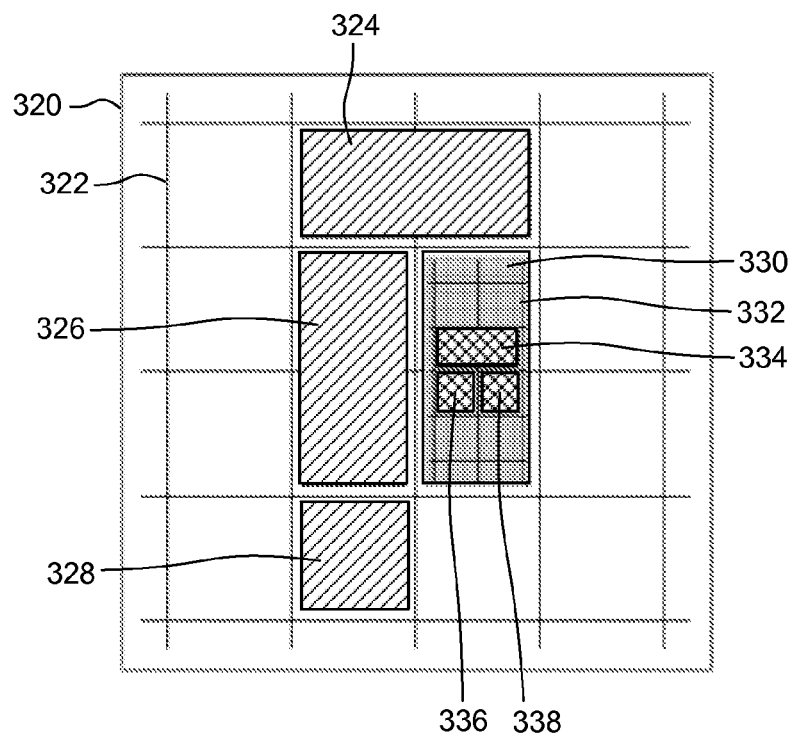

FIG. 3B depicts another user interface displaying graphical objects along with a grid according to an embodiment of the present invention. The example depicted in FIG. 3B assumes a first collection comprising four elements, where one of the elements is also a collection (a second collection). The second collection comprises three non-collection elements. A graphical object 320 is displayed representing the first collection. A grid 322 associated with graphical object 320 is displayed. Graphical objects 324, 326, 328, and 330 representing the four elements of the first collection are displayed. Graphical objects 324, 326, 328, and 330 are drawn in grid cells assigned to the elements that the graphical objects represent. The objects are displayed within the bounds of graphical object 320 representing the first collection. This is achieved by scaling and positioning grid 322 such that cells of grid 322 associated with the elements of the first collection are all within the bounds of graphical object 320. The graphical objects 324, 326, 328, and 330 are also thus completely displayed within the bounds of graphical object 320. The display of grid 322 may be turned on or off.

In the example depicted in FIG. 3B, the element represented by graphical object 330 is another collection containing three elements. Graphical object 330 has a grid 332 associated with it. Graphical objects 334, 336, and 338 representing the three elements of the second collection are displayed. Graphical objects 334, 336, and 338 are drawn in grid cells assigned to the elements that the graphical objects represent. The objects are displayed within the bounds of graphical object 330 representing the second collection. This is achieved by scaling and positioning grid 332 such that cells of grid 332 associated with the elements of the second collection are all within the bounds of graphical object 330. The graphical objects 334, 336, and 338 are also thus completely displayed within the bounds of graphical object 330. The display of grid 332 may be turned on or off.

Figure 4:
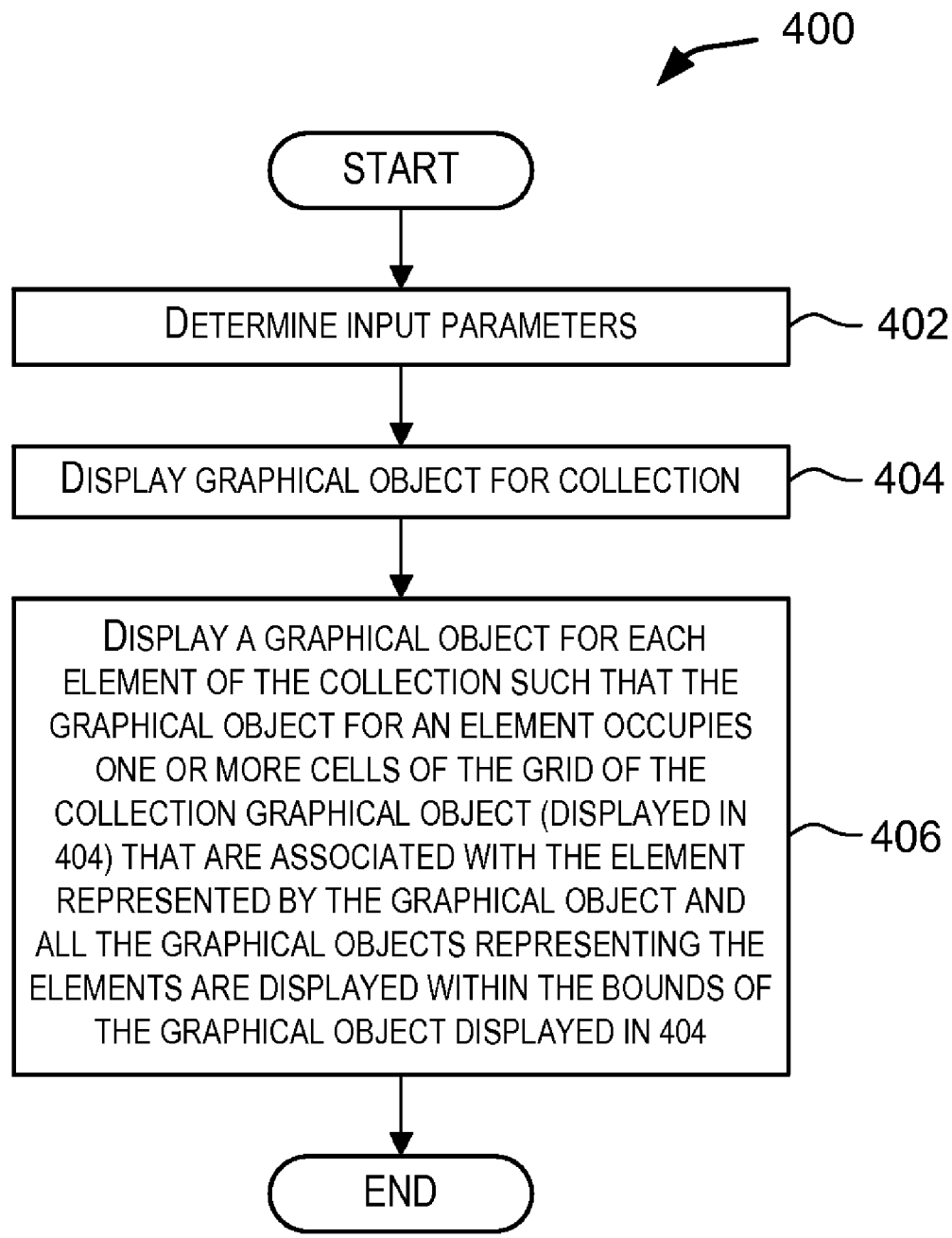
FIG. 4 is a simplified high-level flowchart depicting a method of displaying graphical objects for a collection and elements of the collection according to an embodiment of the present invention.

FIG. 4 is a simplified high-level flowchart 400 depicting a method of displaying graphical objects for a collection and elements of the collection according to an embodiment of the present invention. The method depicted in FIG. 4 may be performed by software modules (code, instructions) executed by a processor, hardware modules, or combinations thereof. The processing may be performed by a system such as system 100 depicted in FIG. 1. Flowchart 400 depicted in FIG. 4 is merely illustrative of an embodiment of the present invention and is not intended to limit the scope of the present invention. Other variations, modifications, and alternatives are also within the scope of the present invention.

As depicted in FIG. 4, a set of input parameters to be used for displaying the graphical objects is determined (step 402). The inputs may include information related to a collection and its elements that are to be represented using one or more graphical objects. A graphical object representing a collection is referred to as a "collection graphical object".

As part of step 402, information related to attributes associated with graphical objects may be determined. For example, information related to the inner and outer bounds associated with the graphical objects may be determined. The inner and outer bounds for a graphical object may be specified by a user. In alternative embodiments, the outer bounds for a graphical object may be determined based upon the available space for displaying the graphical object and the inner bounds for the object may be calculated based upon the outer bounds of the graphical object, such as by shrinking the outer bounds by a certain amount such that the area defined by the inner bounds lies within the area defined by the outer bounds.

As part of 402, information related to a grid associated with a collection graphical object to be used for representing the collection may be determined. The grid lies in a 2-dimensional plane and is a grid of tiled cells. The cells of the grid may be of the same size and shape (a grid of regular-shaped cells) or of different shapes and sizes. The processing performed in 402 may comprise determining the shape and size of the cells of the grid.

Other attributes of graphical objects may also be determined such as information specifying a shape and size for the graphical objects to be displayed, colors or background patterns to be used for displaying the graphical objects, and the like.

As part of step 402, information related to the collection is determined. A list of elements of the collection may be determined. For each element of the collection, the one or more cells of the grid of the collection graphical object associated with the element are determined. An element may be associated with one or more cells of the grid. In one embodiment, a cell of the collection graphical object grid may be associated with multiple elements of the collection. In an alternative embodiment, a cell of the grid may be associated with at most one element of the collection. The alternative embodiment results in non-overlapping display of the graphical objects representing the elements of the collection.

The collection graphical object is then displayed (step 404). The collection graphical object may be rendered or drawn on a visual output device such as a screen or monitor. In a colored user interface, the collection graphical object may be displayed using a particular color according to a color scheme. Information representative of the collection may be displayed along with the graphical object. The grid associated with the collection graphical object may or may not be displayed as part of step 404.

A graphical object is then displayed for each element of the collection (step 406). The graphical object for an element of the collection is displayed such that the displayed graphical object occupies one or more cells of the grid of the collection graphical object that are associated with the element represented by the graphical object. As part of 406, the grid associated with the collection graphical object may be scaled and/or positioned such that all the cells of the grid that are associated with elements of the collection are all located within the bounds of the graphical object representing the collection. The graphical objects representing the elements of the collection are then displayed in the cells associated with the elements represented by the graphical objects. In one embodiment, the grid of the collection graphical object is scaled and positioned such that all graphical objects representing the elements of the collection are displayed as large as possible while being displayed within the bounds of the collection graphical object. In one embodiment, the graphical objects representing the elements of the collection are displayed within the inner bounds of the graphical object representing the collection. In alternative embodiments, for example in scenarios where a graphical object does not have an inner bounds or the inner bounds is the same as the outer bounds, the graphical objects representing the elements may be drawn within the outer bounds of the collection graphical object.

In the manner described above, a graphical object may be displayed for a collection and one or more graphical objects may be displayed representing elements of the collection such that the graphical objects for the elements are displayed within the bounds (typically inner bounds) of the graphical object representing the collection. As previously described, an element of the collection may itself be a collection (a second collection). The method depicted in FIG. 4 and described above may then be re-executed for drawing graphical objects representative of elements of the second collection. In this manner, the method depicted in FIG. 4 and described above may be used to draw graphical objects for collections and elements of collections at various levels of the collection hierarchy. Where at most one element of a collection is associated with a cell, the graphical objects displayed at the various collection levels are all visible at the same time. The graphical objects are also individually selectable at the same time. As previously described, a graphical object may be selected using an input device such as a mouse, trackball, touchpad, pen, etc. Different techniques may be used for showing a selected graphical object such as emphasizing the border of the selected graphical object, changing the color or transparency of the selected graphical object, etc.

The graphical objects may be displayed in various different ways. In one embodiment, different colors may be used to display the graphical objects such that the containment relationship is clearly visible. The colors that are used may be based upon a user-configured color scheme. The colors may also be automatically chosen to increase the aesthetic value of the display. In one embodiment, a graphical object for a non-collection element may be displayed such that the display provides a visual indication of the nature or contents of the element. For example, if the element is a document, a graphical object displayed for the document may display a visual representation generated based upon the contents of the document. For example, a thumbnail may be created based upon the contents of the document and the thumbnail may be displayed as part of the graphical object representing the document.

The grid associated with a graphical object representing a collection and used for displaying the graphical objects representing the elements of the collection (as done in step 406 of FIG. 4) may comprise tiled regular-shaped cells or non-regular shaped cells.

Figure 5:
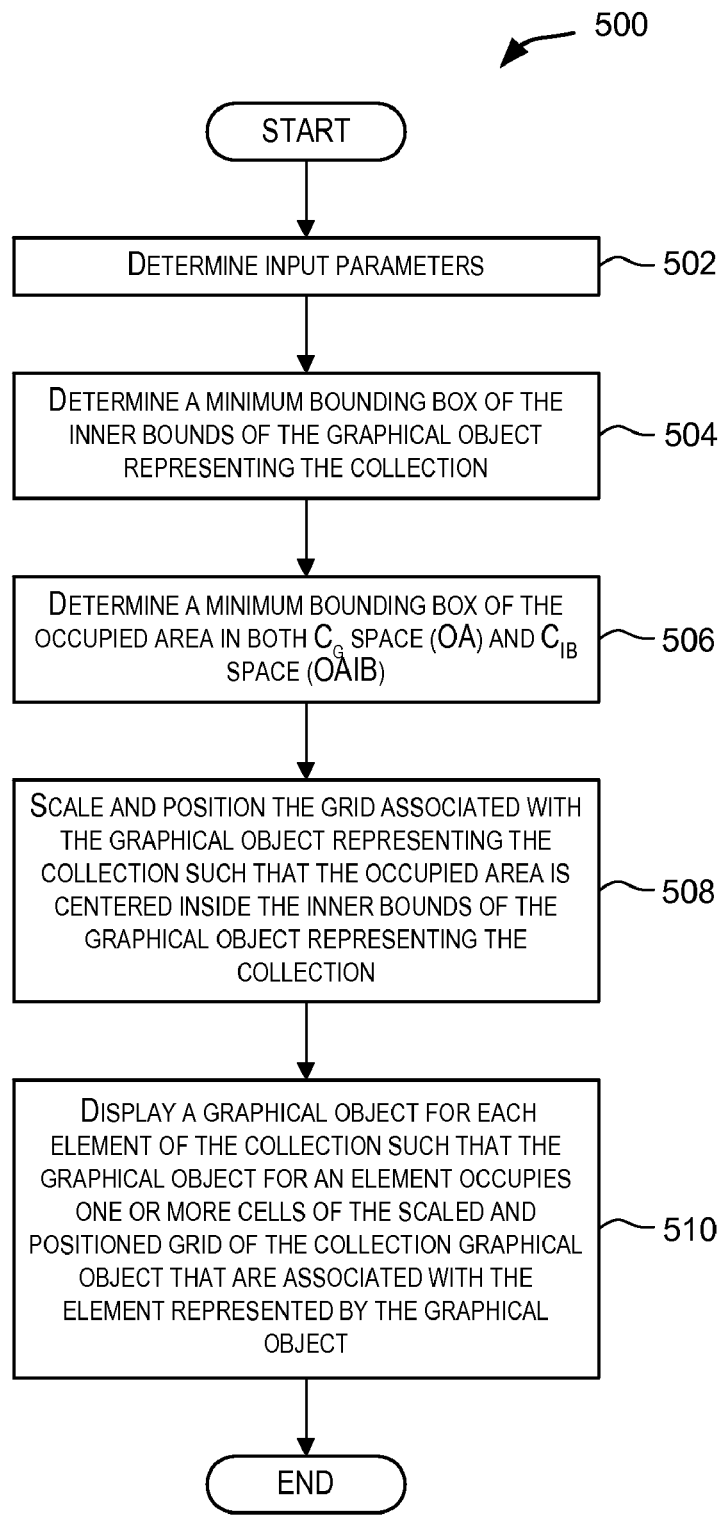
FIG. 5 is a simplified high-level flowchart depicting a method of displaying graphical objects for a collection and its elements according to an embodiment of the present invention wherein the grid associated with an graphical object representing the collection comprises regular shaped cells.

FIG. 5 is a simplified high-level flowchart 500 depicting a method of displaying graphical objects for a collection and its elements according to an embodiment of the present invention wherein the grid associated with graphical object representing the collection comprises regular shaped cells. The method depicted in FIG. 5 further assumes that the inner bounds of each graphical object is rectangular shaped and that the cells of the grid associated with a graphical object are non-overlapping square cells. The method depicted in FIG. 5 may be performed by software modules (code, instructions) executed by a processor, hardware modules, or combinations thereof. The processing may be performed by a system such as system 100 depicted in FIG. 1. Flowchart 500 depicted in FIG. 5 is merely illustrative of an embodiment of the present invention and is not intended to limit the scope of the present invention. Other variations, modifications, and alternatives are also within the scope of the present invention.

As depicted in FIG. 5, input parameters to be used by the display process are determined (step 502). According to an embodiment of the present invention, the following parameters are determined:

(1) Collection information—This information identifies a collection and a list of elements within the collection;

(2) An area defined by an outer bounds of the graphical object representing a collection of elements. The area is defined as a rectangular region with the corners ($OB_x$, $OB_y$), ($OB_x+OB_{width}$, $OB_y$), ($OB_x+OB_{width}$, $OB_y+OB_{height}$), ($OB_x$, $OB_y+OB_{height}$) in the coordinate system of the inner bounds of the graphical object ($C_{IB}$) in which the graphical object representing the collection is being rendered. $OB_{width}$ represents the width and $OB_{height}$ the height of the graphical object representing the collection (i.e., the width and height of the outer bounds of the graphical object).

Figure 6:
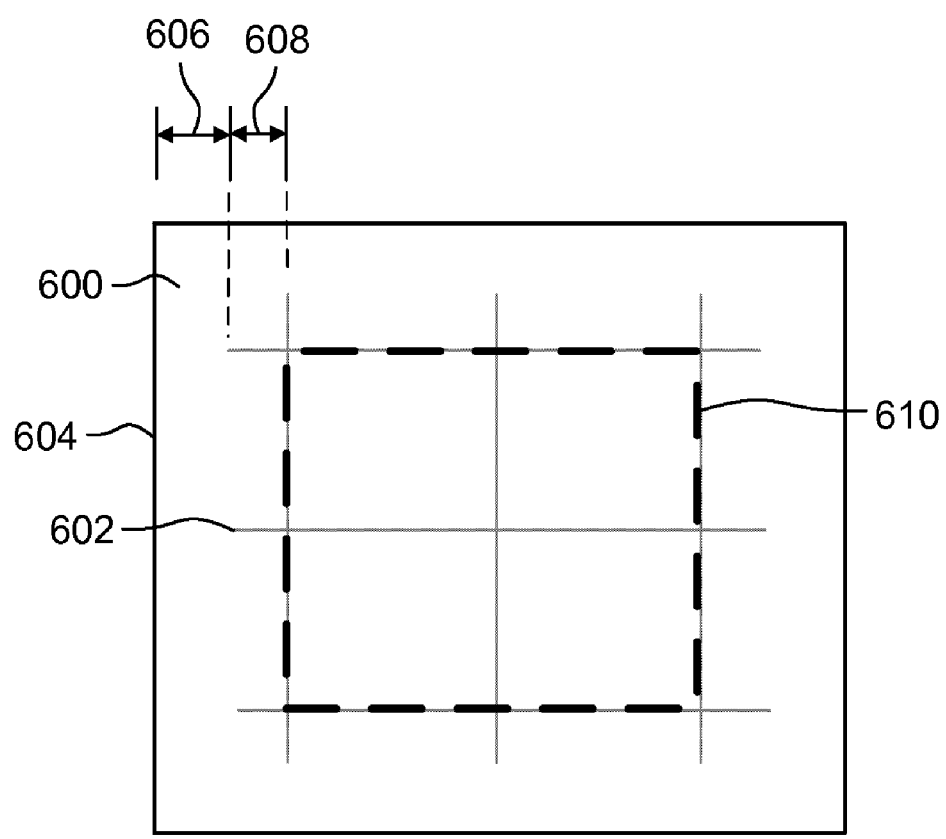
FIG. 6 depicts margin parameters used to determine an inner bounds for a graphical object according to an embodiment of the present invention.

(3) Information for determining an inner bounds for the graphical object representing the collection. In one embodiment, two different kinds of margins are provided, namely, a grid gutter parameter and a table fringe parameter. The grid gutter parameter specifies the margin between the edge or outer bounds of the graphical object representing the collection (the collection graphical object) and the start of the grid lines associated with the collection graphical object. For example, reference 606 in FIG. 6 points to a grid gutter parameter margin for a graphical object 600 having an associated grid 602 and an outer bounds 604. In one embodiment, the grid gutter parameter defaults to 3% of either the width or height of the outer bounds of the collection graphical object, whichever has a lower value. The table fringe parameter specifies the margin between the start of the displayed portion of the grid and the first occupied cell. For example, reference 608 in FIG. 6 points to a table fringe parameter margin for graphical object 600 having an associated grid 602 and an outer bounds 604. This margin insures that a "fringe" of the edges of empty cells surround the main area, creating the impression that the user is seeing just a small part of an infinite grid. In one embodiment, this defaults to 5% of either the width or height of the outer bounds of the collection graphical object, whichever is smaller. In one embodiment, the inner bounds for the collection graphical object is calculated as the outer bounds minus these two margins. In FIG. 6, the inner bounds of graphical object 600 is depicted by dotted line 610. The values for grid gutter and table fringe parameters may be specified by a user or automatically determined based upon the dimensions of a graphical object.

(4) Information related to a grid associated with the graphical object representing the collection. In one embodiment, the grid is defined as an infinite tiling of non-overlapping square cells, all cells being the same height and width, and in the same orientation as the rectangular outer bounds. In one embodiment, cell positions are defined in the grid's own coordinate system ($C_g$) as an (x,y) coordinate where x and y are integers representing the location of the top-left corner of a single 1×1 cell in the grid. Coordinates in $C_g$ space may be converted into the coordinate space ($C_{IB}$) of the inner bounds of the graphical object representing a collection by applying the transformation $T_{g \rightarrow IB}$, the transformation comprising of a scaling component $S_{g \rightarrow IB}$, a horizontal translation component $X_{g \rightarrow IB}$ and a vertical translation component $Y_{g \rightarrow IB}$. If the grid is neither scaled nor repositioned relative to $C_{IB}$ (that is, if $S_{g \rightarrow IB}=1$ and $X_{g \rightarrow IB}$ and $Y_{g \rightarrow IB}$ are both 0) then each cell of the grid will be at the same location as the point in $C_{IB}$ with the same corresponding coordinates.

(5) For each element of the collection, information identifying a list of one or more cells from the grid of the collection graphical object that are associated with the element. In one embodiment, the information for each element identifies position information and span information, where the position of an element E of the collection is the x,y coordinate ($E_x$, $E_y$) of the top-left cell of the grid associated with the element and span is ($E_{width}$, $E_{height}$) as measured in integer numbers of cells of the grid. The area defined by the union of cells that are associated with elements of a collection is called the occupied area of the grid.

After determining the input parameters, a minimum bounding box of the inner bounds of the graphical object representing the collection is determined (step 504). The inner bounds of the collection graphical object may be calculated as follows:

Grid-Gutter $(GG)=K_1$*Minimum($OB_{Width}$, $OB_{height}$)

where $K_1$ is some user-configurable constant which defaults to 0.03 and $OB_{width}$ and $OB_{height}$ are width and height parameters of the outer bounds of the collection graphical object.

Table-Fringe $(TF)=K_2$*Minimum($OB_{width}$, $OB_{height}$)

where K2 is some user-configurable constant which defaults to 0.05

The minimum bounding box of the inner bounds is defined in $C_{IB}$ as the rectangular region with top-left corner at ($IB_x$, $IB_y$) and dimensions ($IB_{width}$, $IB_{height}$), where:

$IB_x=OB_x+GG+TF$ $IB_y=OB_y+GG+TF$ and $IB_{width}=OB_{width}-GG-TF$ $IB_{height}=OB_{height}-GG-TF$ A minimum bounding box of the occupied area in both $C_g$ space (OA) and $C_{IB}$ space (OAIB) is then calculated (step 506). As previously indicated, the occupied area is the area corresponding to the union of all cells in the grid that are associated with at least one element of a collection. As part of 506, first the minimum and maximum x and y coordinate values for the occupied area are determined using the following algorithm:

Set $min_x$=+Infinity

Set $max_x$=−Infinity

Set $min_y$=+Infinity

Set $max_y$=−Infinity

Loop for each element, E, in the collection:

Set $min_x$=Minimum($E_x$, $min_x$)

Set $max_x$=Maximum($E_x+E_{width}$, $max_x$)

Set $min_y$=Minimum($E_y$, $min_y$)

Set $max_y$=Maximum($E_y+E_{height}$, $max_y$)

The minimum bounding box of the occupied area is defined in $C_g$ as the rectangular region on the grid starting with the top-left cell at ($OA_x$, $OA_y$) where $OA_x=min_x$ $OA_y=min_y$ and with dimensions:

$OA_{width}=max_x-min_x$ $OA_{height}=max_y-min_y$

The minimum bounding box of the occupied area is defined in $C_{IB}$ as

OAIB=OA transformed into $C_{IB}$ by $T_{g \rightarrow IB}$

If the grid's current scaling $S_{g \rightarrow IB}$ is 1 and position offsets ($X_{g \rightarrow IB}$ and $Y_{g \rightarrow IB}$) are both zero then OAIB=OA.

The grid is then scaled and positioned such that the occupied area is centered inside the inner bounds of the graphical object representing the collection (step 508). This may be done as follows. Given a current scaling for the grid "old $S_{g \rightarrow IB}$", a new scaling for the grid is selected as $S_{g \rightarrow IB}$=Minimum($IB_{width}/OAIB_{width}$, $TB_{height}/OAIB_{height}$)*(old $S_{g \rightarrow IB}$)

In one embodiment, the positioning is done as follows:

set IB-$mid_x$=$IB_x$+($IB_{width}/2$)

set IB-$mid_y$=$IB_y$+($IB_{height}/2$)

set OAIB-$mid_x$=$OAIB_x$+($OAIB_{width}/2$)

set OAIB-$mid_y$=$OAIB_y$+($OAIB_{height}/2$)

set $Offset_x$=IB-$mid_x$−OAIB-$mid_x$ set $Offset_y$=IB-$mid_y$−OAIB-$mid_y$ set $X_{g \rightarrow IB}$ such that the grid is moved by $Offset_x$ to the right set $Y_{g \rightarrow IB}$ such that the grid is moved by $Offset_y$ down The processing performed in 508 is iterative, and takes into account the previous scaling and position. The iterative scaling and reposition is performed until the occupied area is centered inside the inner bounds of the graphical object representing the collection.

Upon completion of step 508, the grid of the collection graphical object has a scale and position determined by a new $T_{g \rightarrow IB}$ and all grid cells of the graphical object associated with the collection elements are fully contained within the inner bounds of the graphical object representing the collection. A graphical object is then displayed for each element of the collection such that the graphical object for an element occupies one or more cells of the scaled and positioned grid of the collection graphical object that are associated with the element represented by the graphical object (step 510). Since the cells associated with elements are all positioned within the inner bounds of the collection graphical object (as a result of the processing performed in 508), the graphical objects representing the elements of the collection are automatically displayed within the inner bounds of the collection graphical object.

In one embodiment, an additional margin is added between the edge of each graphical object representing an element of the collection and the grid lines of a cell. In one embodiment, this additional margin defaults to 7.5% of the width and height of a single cell in the grid. This ensures that some spacing exists between the outer bounds of graphical objects and the grid lines when the graphical objects are displayed. This additional element margin ensures that graphical objects representing two elements that nominally are associated with adjoining grid cells will be rendered with a small space between them.

The method depicted in FIG. 5 and described may be used to display various collection graphical objects and graphical objects for collections and their elements at different levels of the collection hierarchy. Examples of user interface displays generated by applying the method depicted in FIG. 5 are shown in FIGS. 3A and 3B.

Figure 7:
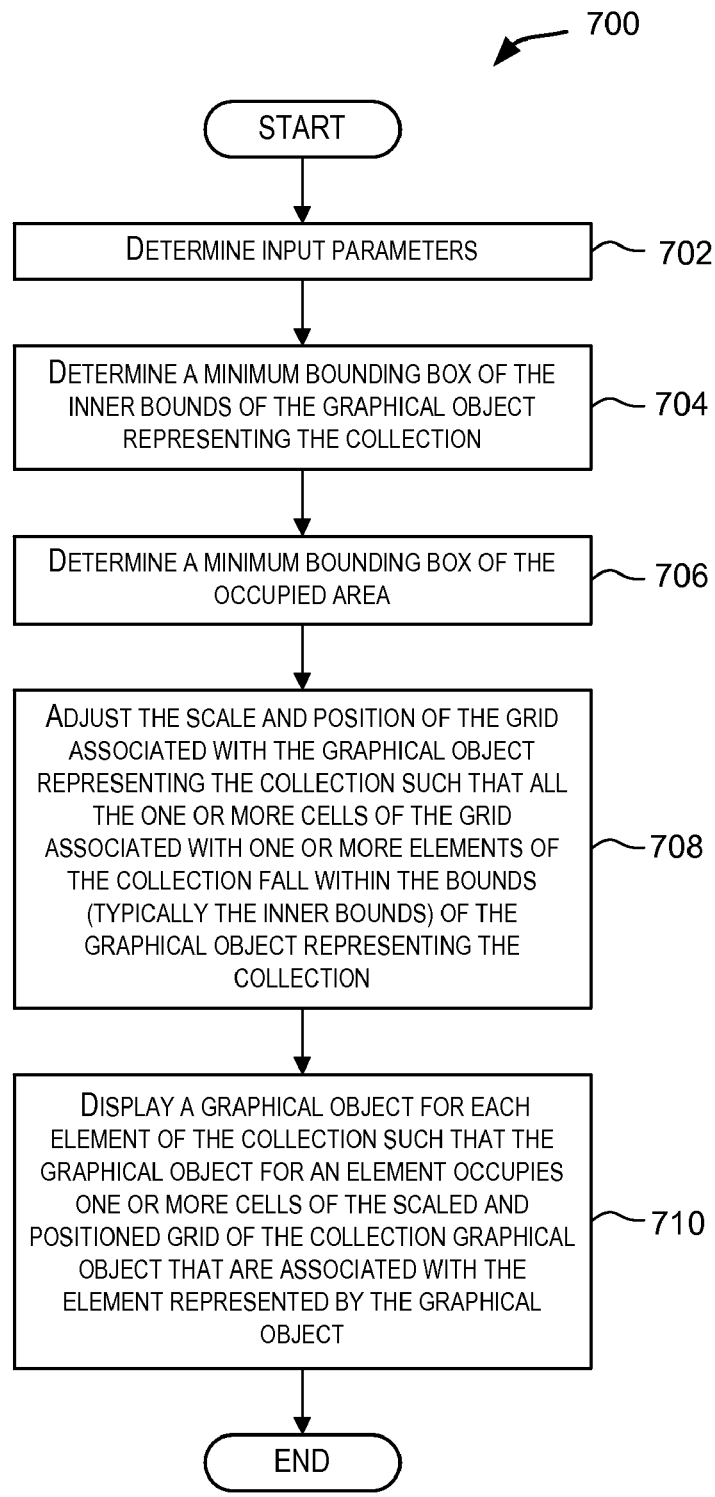
FIG. 7 is a simplified high-level flowchart depicting a generalized method of displaying graphical objects for a collection and its elements according to an embodiment of the present invention.

FIG. 7 is a simplified high-level flowchart 700 depicting a generalized method of displaying graphical objects for a collection and its elements according to an embodiment of the present invention. The method depicted in FIG. 7 makes no assumptions about the shape or size of the graphical objects including the graphical object representing a collection. The method also makes no assumptions of the shape and size of individual cells of a grid associated with a collection graphical object, or whether cells are all the same shape and size. Further, no assumptions are made whether elements occupy contiguous cells or even whether the graphical object representing the collection is itself contiguous. In one embodiment, the method uses an O(N3) algorithm and performs processing by searching the entire space of scales and 2D positions to find a position and scale whereby the graphical objects for the elements of a collection are displayed within the bounds (typically inner bounds) of the graphical object representing the collection. The method depicted in FIG. 7 may be performed by software modules (code, instructions) executed by a processor, hardware modules, or combinations thereof. The processing may be performed by a system such as system 100 depicted in FIG. 1. Flowchart 700 depicted in FIG. 7 is merely illustrative of an embodiment of the present invention and is not intended to limit the scope of the present invention. Other variations, modifications, and alternatives are also within the scope of the present invention.

As depicted in FIG. 7, processing starts by determining the input parameters to be used for displaying the graphical objects for the collection hierarchy (step 702). According to an embodiment of the present invention, the following parameters are determined:

(1) Collection information—This information identifies a collection and a list of elements within the collection;

(2) An area defined by an inner bounds of the graphical object representing a collection of elements. This area is defined as a set of one or more finite 2-dimensional regions defined in the coordinate system ($C_{IB}$) in which the graphical object representing the collection is being represented.

(3) Description of a grid associated with the graphical object representing the collection. The grid associated with a graphical object representing a collection is defined as an area completely covered by non-overlapping cells. The cells of the grid may be of different sizes and shapes, and the area covered may be infinite (as is the case of a simple tiling of squares in an infinite matrix) or finite. Cell positions in the grid are defined in the grid's own coordinate system ($C_g$). Coordinates in $C_g$ space can be converted into $C_{IB}$ space by applying the transformation $T_{g \to IB}$, the transformation comprising of a scaling component $S_{g \to IB}$, a horizontal translation component $X_{g \to IB}$, and a vertical translation component $Y_{g \to IB}$.

(4) For each element in the collection, information identifying a list of one or more cells from the grid of the collection graphical object that are associated with the element. The area defined by the union of cells of the grid that are associated with at least one element of the collection is called the occupied area.

Referring back to FIG. 7, the minimum bounding box of the inner bounds of the graphical object representing the collection is calculated (step 704). The minimum bounding box of the inner bounds is defined in $C_{IB}$ as the rectangular region with top-left corner at ($IB_x$, $IB_y$), and dimensions ($IB_{width}$, $IB_{height}$), where:

$IB_x$=the x-coordinate of the left-most point of the inner bounds $IB_y$=the y-coordinate of the top-most point of the inner bounds $IB_{width}$=(the x-coordinate of the right-most point of the inner bounds)–$IB_x$ $IB_{height}$=(the y-coordinate of the bottom-most point of the inner bounds)–$IB_y$ The minimum bounding box of the occupied area is then calculated (step 706). The minimum bounding box of the occupied area is defined in $C_g$ as the rectangular region with top-left corner at ($OA_x$, $OA_y$), and dimensions ($OA_{width}$, $OA_{height}$), where:

$OA_x$=the x-coordinate of the left-most point of the occupied area $OA_y$=the y-coordinate of the top-most point of the occupied area $OA_{width}$=(the x-coordinate of the right-most point of the occupied area)–$OA_x$ $OA_{height}$=(the y-coordinate of the bottom-most point of the occupied area)–$OA_y$ The minimum bounding box of the occupied area calculated in $C_g$ coordinate system is then transformed to a bounding box OAIB of the occupied area in $C_{IB}$ using the transform $T_{g \to IB}$.

The scale and position of the grid associated with the graphical object representing the collection is then adjusted such that all the cells of the grid associated with one or more elements of the collection fall within the bounds (typically the inner bounds) of the graphical object representing the collection (step 708). In one embodiment, the processing performed in 708 is as follows:

Given a current scaling for the grid "old $S_{g \to IB}$", a new scaling for the grid is picked for the grid as follows, $S_{g \to IB}$=Minimum($IB_{width}/OA_{width}$, $IB_{height}/OA_{height}$)* (old $S_{g \to IB}$)

A parameter Scale-Found is set to false
The following "While" loop is then executed
While not Scale-Found:

---

- Set $X_{g \to IB}$ and $Y_{g \to IB}$ such that $T_{g \to IB}((OA_x, OA_y)) = (IB_x, IB_y)$, which moves the grid such that the upper-left corner of the bounding box of the occupied area is at the same position as the upper-left corner of the bounding box of the inner bounds.
- While (not Scale-Found) and (the y-coordinate of $T_{g \to IB}((OA_x + OA_{width}, OA_y + OA_{height})) <= IB_y + IB_{height}$):
    -- Set $X_{g \to IB}$ such that the x-coordinate of $T_{g \to IB}((OA_x, OA_y)) = IB_x$
    -- While (not Scale-Found) and (the (the x-coordinate of $T_{g \to IB}((OA_x + OA_{width}, OA_y + OA_{height})) <= IB_x + IB_{width}$):
        --- If (no part of the occupied area (as transformed by $T_{g \to IB}$) overlaps a region outside of the inner bounds):
            ---- set Scale-Found to true
        --- else
            ---- Set $X_{g \to IB}$ such that the grid is moved further to the right by $\epsilon_x$, where $\epsilon_x$ is small.
    -- If not Scale-Found, Set $Y_{g \to IB}$ such that the grid is moved further down by $\epsilon_y$, where $\epsilon_y$ is small.
- If not Scale-Found, shrink the grid slightly by reducing $S_{g \to IB}$ by $\epsilon_S$, where $\epsilon_S$ is small

---

At the end of the above processing, the grid has a scale and position determined by $T_{g \to IB}$ and all cells of the grid associated with elements of the collection are now fully contained within the inner bounds of the graphical object representing the collection. In one embodiment, the grid is scaled and positioned such that the geometric center (centroid) of the minimal bounding box of the occupied area is the same as the geometric center (centroid) of the graphical object representing the collection.

A graphical object is then displayed for each element of the collection such that the graphical object for an element occupies one or more cells of the scaled and positioned grid of the collection graphical object that are associated with the element represented by the graphical object (step 710). The graphical object for an element is drawn in the one or more cells of the grid associated with the element. Since the grid is scaled and positioned such that all cells associated with elements of the collection are positioned within the inner bounds of the graphical object representing the collection, all the graphical objects for the elements are positioned and displayed within the inner bounds of the graphical object representing the collection.

In the previous description, the graphical objects representing elements of a collection are displayed within the inner bounds of the graphical object representing the collection, where the inner bounds is determined based upon the outer bounds of the graphical object representing the collection. As previously described, the inner bounds of a graphical object may be the same as or less than the outer bounds, In embodiments where the inner bounds is the same as the outer bounds, either the inner bounds or the outer bounds of the collection graphical object may be used for the various calculations.

The displayed graphical objects, including the graphical object representing the collection and the graphical objects representing elements of the collection, are individually selectable. One or more graphical objects may be selected at a time. When a selection is made using an input device such as a mouse, there may be one or more graphical objects representing elements or collections under the cursor of pointing device. In such a scenario, in one embodiment, the graphical object representing the most deeply-nested element (which may be a collection or a non-collection) under the cursor and that is also available for selection is selected. This is usually the visible, or "on top" element, though it may be that the most on-top element is not available for selection at which time selection will cascade to the element's parent. The most common example of such a case is when selecting a graphical object representing a collection into which an element is to be dropped: the graphical object representing the element being dragged is not available for selection (even though it is, by definition, under the cursor) and there might be a graphical object representing a non-collection directly under the cursor, but what gets selected for the drop-zone is the graphical object representing the top-most available collection.

One or more operations may be performed using the selected graphical objects. Operations performed on a graphical object generally cause the operation to be performed on an element or collection represented by the graphical object. For example, double clicking a graphical object may open the element (e.g., a document) represented by the graphical object. Operations may be also performed that affect the manner in which the graphical objects are displayed without affecting the elements represented by the graphical objects. Examples of some operations are provided below.

(1) Resizing a graphical object displayed within a collection graphical object: A graphical object representing an element of a collection may be resized. The resize operation may cause a change in the cells of the grid associated with the element represented by the resized graphical object. This may cause a change in the display of other graphical objects representing other elements within the collection. In one embodiment, the method depicted in FIG. 7 and described above is then re-executed to redisplay the graphical objects representing the elements of the collection. In the re-execution, the "new" cells associated with the element represented by the resized graphical object are used for the calculations. If the resized graphical object itself represents a collection (a second collection), then the graphical objects that have been displayed representing elements of the second collection may be affected by the resizing. In one embodiment, the method depicted in FIG. 7 and described above is then rerun to redisplay the graphical objects representing the elements of the second collection.

(2) Repositioning a graphical object within a collection graphical object: The location of a graphical object representing an element of a collection may be changed within the bounds of the collection graphical object. The reposition operation may cause a change in the cells of the grid associated with the element represented by the repositioned graphical object. This may cause a change in the display of other graphical objects representing other elements within the collection. In one embodiment, the method depicted in FIG. 7 and described above is then rerun to redisplay the graphical objects representing the elements of the collection. In the rerun, the "new" cells associated with the element represented by the repositioned graphical object are used for the calculations.

(3) Adding an element to a collection: An element may be added to a collection. A graphical object representing the newly added element is then displayed. The display of the new graphical object may cause a redisplay of all the other graphical objects representing other elements of the collection. In one embodiment, the method depicted in FIG. 7 and described above is re-executed, now with the newly added element. As part of the processing, one or more cells of the grid associated with the newly added element are determined and used for the calculations.

(4) Deleting an element from a collection: An element may be deleted from a collection. After a deletion, the graphical object displayed for the element is no longer displayed. In one embodiment, the method depicted in FIG. 7 and described above is re-executed, now without the deleted element.

As previously described, a graphical object is individually selectable. One or more graphical objects may be selected at a time and operations performed on the selected set of graphical objects. Drag and drop operations may be performed using a selected graphical object. For example, an element may be deleted from a first collection and added to a second collection by selecting the graphical object representing the element, dragging the selected graphical object from the graphical object representing the first collection and dropping it into a graphical object representing the second collection. When the selected graphical object is dropped into the graphical object representing the second collection, the selected graphical object may snap to one or more cells of the grid of the graphical object representing the second collection. The cells to which the selected graphical object snaps to are then associated with the element represented by the selected graphical object. In a grid comprising rectangular cells, a dragged graphical object's drop zone may be calculated as the nearest patch of empty cells of the grid that are large enough to hold the selected graphical object. The graphical objects representing elements of the first collection and the second collection may be redrawn after the drag and drop operation as previously described.

According to an embodiment of the present invention, when the graphical objects representing elements of a collection are redisplayed, the position of each graphical object displayed within the bounds of the collection graphical object relative to other graphical objects displayed within the bounds of the collection graphical object is the same as prior to the redisplaying operation. The size of each graphical object displayed within the bounds of the collection graphical object relative to other graphical objects displayed within the bounds of the collection graphical object is the same as prior to the redisplaying. Further, in one embodiment, the aspect ratio of each graphical object is the same as the aspect ratio of the graphical object prior to the redisplaying.

The techniques described above may be used to display graphical objects representing collections and non-collections at different collection hierarchies. In situations where the collection hierarchy is very deep (e.g., tens or hundreds of nested collections), if the techniques previously described were followed, then a lot of time could be wasted in rendering graphical objects representing elements that wind up being displayed less than a single pixel in size. Several techniques may be used to reduce such an occurrence. In one embodiment, the display techniques are modified such that if a graphical object representing a collection is computed as having a width or height smaller than a certain threshold, then the graphical object is rendered as an empty collection and the collection treated as an empty collection for purposes of displaying the collection hierarchy. In this manner, the display computation is stopped at the level of the "empty" collection.

Further, displayed graphical objects that are very small in size may become difficult to select using an input device such as a mouse. Due to this, a size limit or threshold may be set for performing selection tasks. If a graphical object representing an element in a collection that is being rendered is smaller than a threshold size (e.g., a threshold width or height) then the graphical object is not considered available for selection.

Embodiments of the present invention may also be used to represent collections that represent not just nested hierarchies (i.e., trees) but also webs (directional graphs) where a particular object might appear as an element in multiple collections. One such example is a visualization of a web site, where every page is a collection and every page linked to by that page is represented as an element within the collection. Such a visualization might even have infinitely-nested collections, where A contains B and B contains A.

Figure 8A:
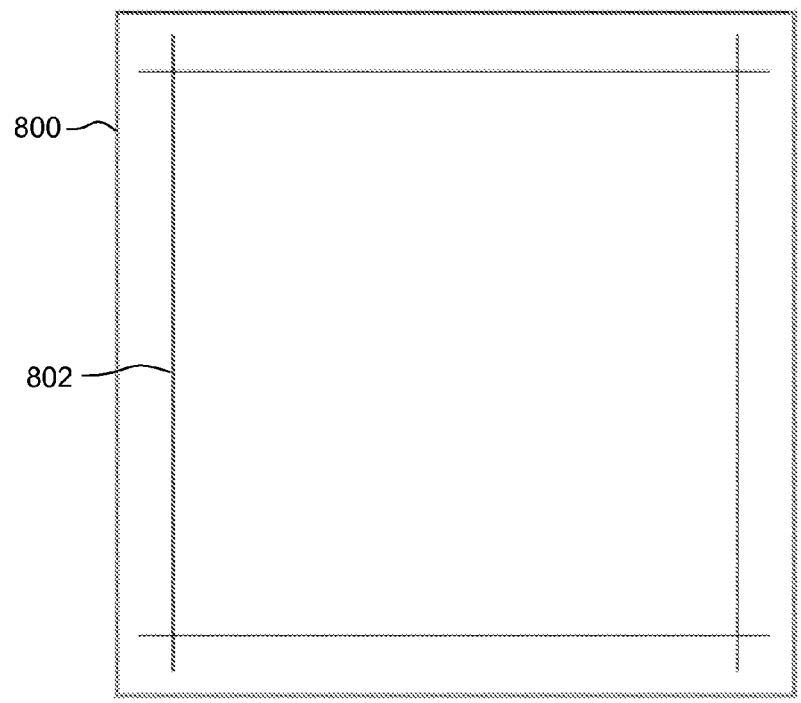
FIGS. 8A, 8B, 8C, 8D, 8E, 8F, 8G, 8H, 8I, 8J, and 8K depict examples of graphical objects drawn according to an embodiment of the present invention.
Figure 8B:
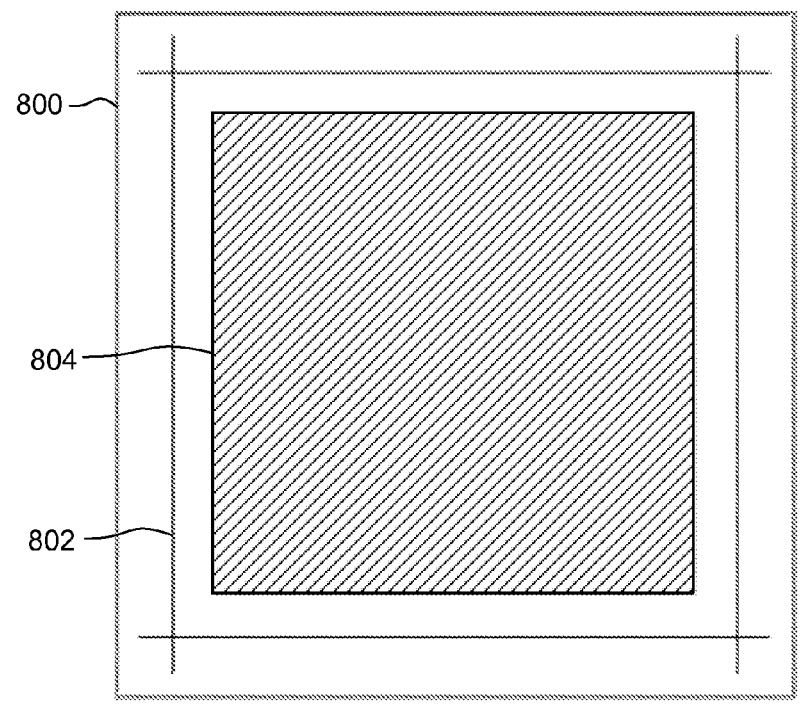
Figure 8C:
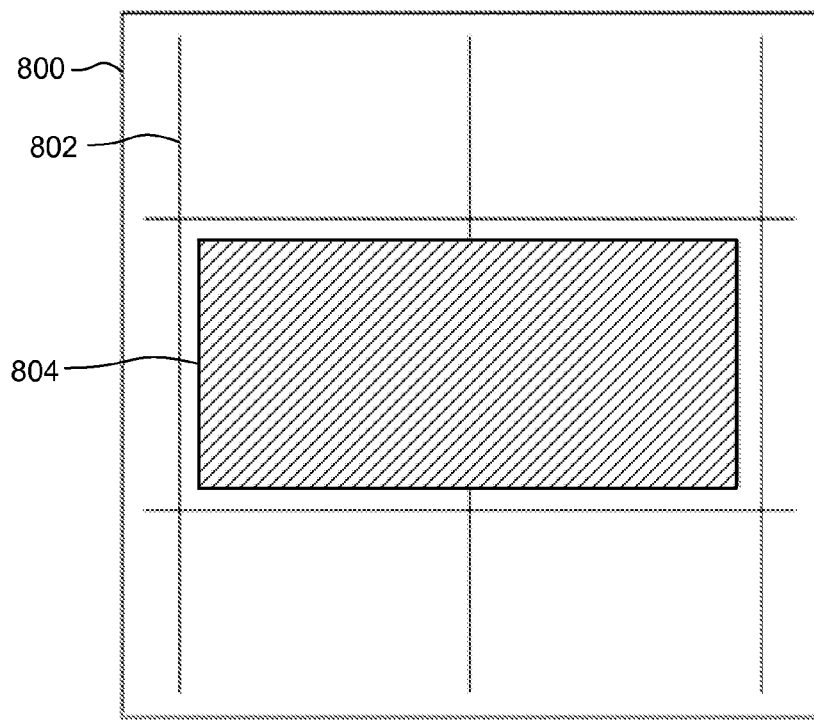

FIGS. 8A, 8B, 8C, 8D, 8E, 8F, 8G, 8H, 8I, 8J, and 8K depict examples of graphical objects drawn according to an embodiment of the present invention. FIG. 8A depicts a graphical object 800 for an empty collection (i.e., a collection with no elements). A grid 802 is associated with graphical object 800 and displayed. A non-collection element is then added to the collection. FIG. 8B depicts graphical objects representing the collection with one element. A graphical object 804 is drawn representing the element within a cell of grid 802. In FIG. 8C, the graphical object 804 has been resized such that it now occupies two cells of grid 802. Grid 802 is scaled and resized such that the cells occupied by the element represented by graphical object 804 fall within the bounds of collection graphical object 800.

Figure 8D:
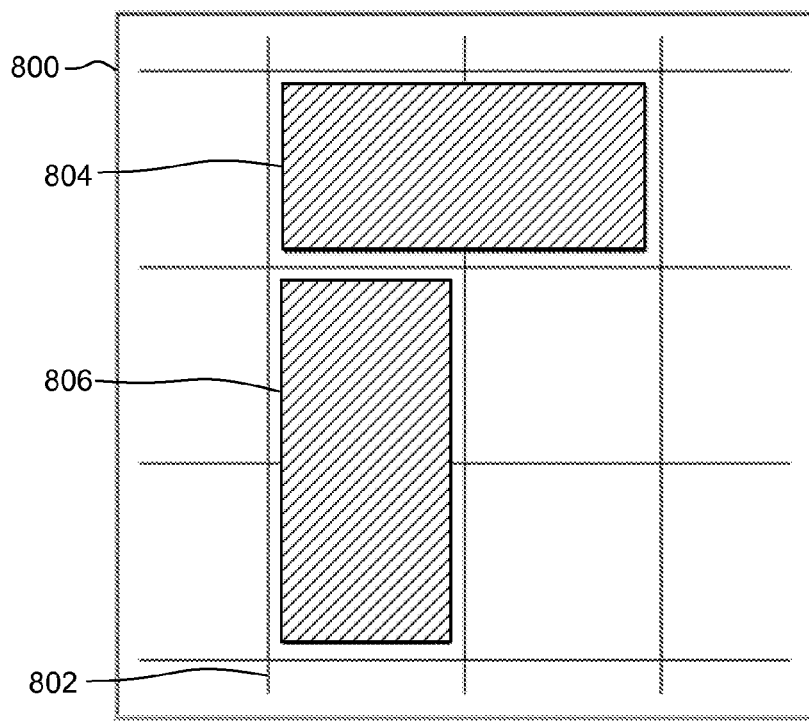

In FIG. 8D, a second element has been added to the collection. Accordingly, a second graphical object 806 representing the second element is now displayed within the bounds of collection graphical object 800. Grid 802 is scaled and resized such that the cells occupied by the elements represented by graphical objects 804 and 806 fall within the bounds of collection graphical object 800. When compared to FIG. 8C it can be seen that the size of the cells of grid 802 has been reduced due to scaling down of grid 802 in order to fit both the graphical object for the first element and the graphical object for the second element.

Figure 8E:
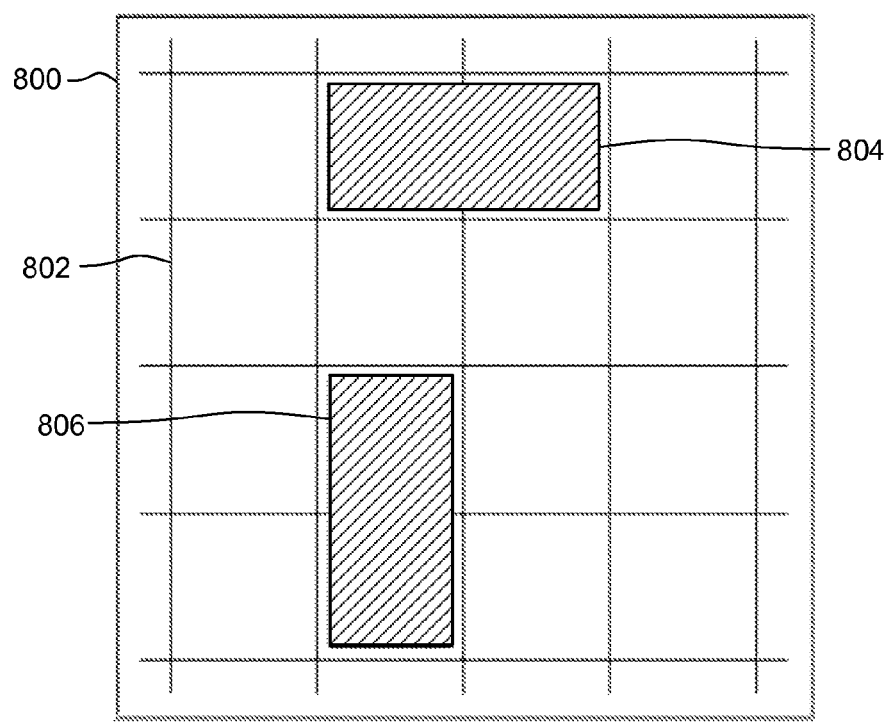

In FIG. 8E, graphical object 806 representing the second element has been repositioned within graphical object 800. Grid 802 is scaled and resized such that the cells occupied by the elements represented by graphical objects 804 and 806 fall within the bounds of collection graphical object 800. When compared to FIG. 8D it can be seen that the size of the cells of grid 802 has been reduced due to scaling down of grid 802 in order to fit the repositioned graphical object for the second element.

Figure 8F:
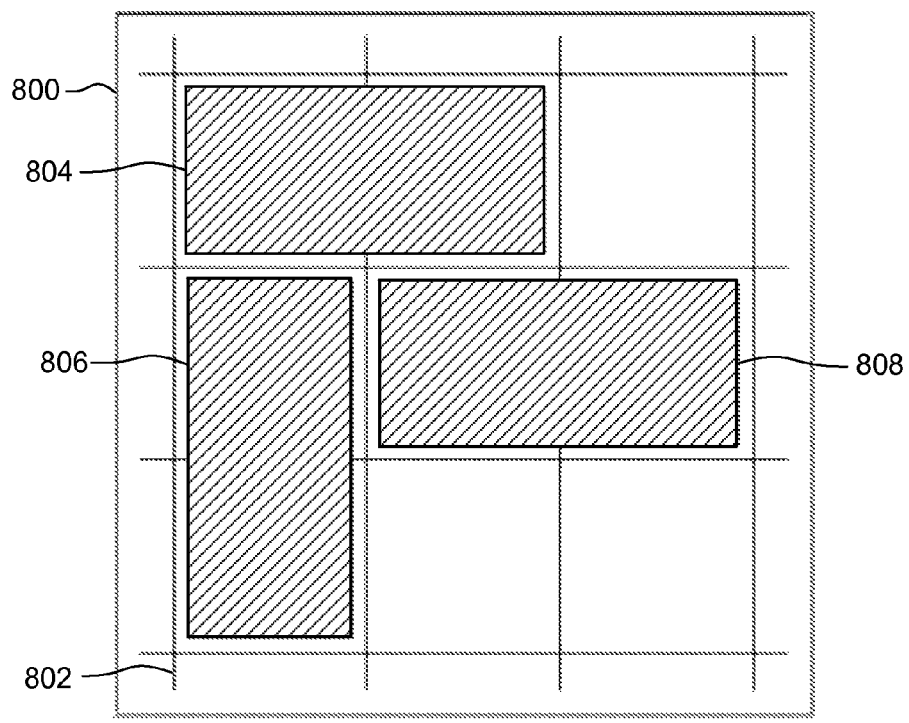
Figure 8G:
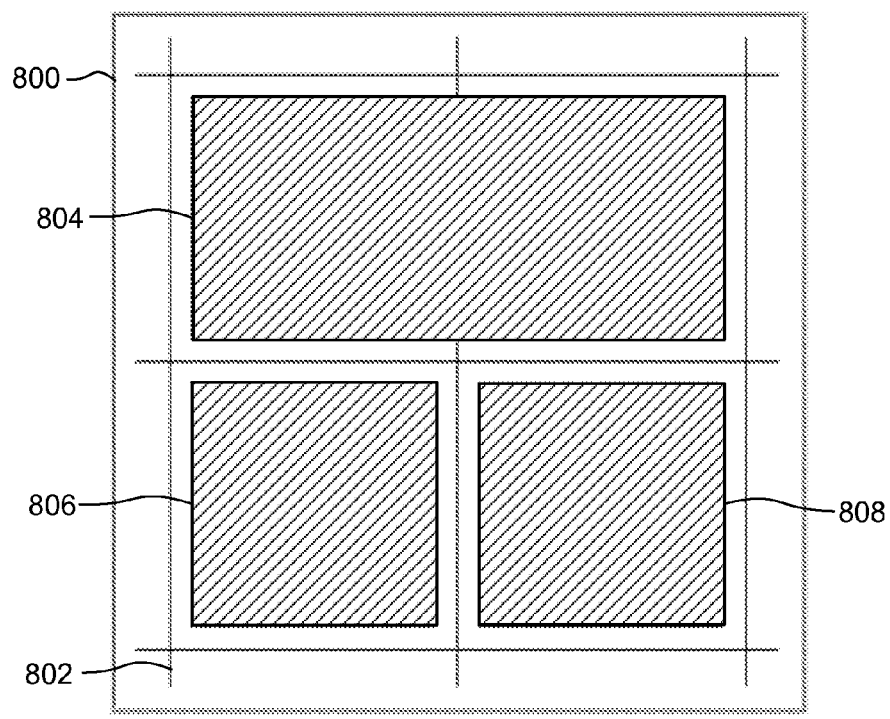

In FIG. 8F, a third element has been added to the collection depicted in FIG. 8D. A new graphical object 808 is displayed to represent the third element. In FIG. 8G, both the graphical object 806 representing the second element and the graphical object 808 representing the third element have been resized to occupy only one cell of grid 802. Grid 802 is scaled and resized (reduced in size) such that the cells occupied by the elements represented by graphical objects 804, 806, and 808 fall within the bounds of collection graphical object 800 and the graphical objects are displayed as large as possible. As can be seen, the size of the cells of grid 802 has been increased from the size of the cells in FIG. 8F.

Figure 8H:
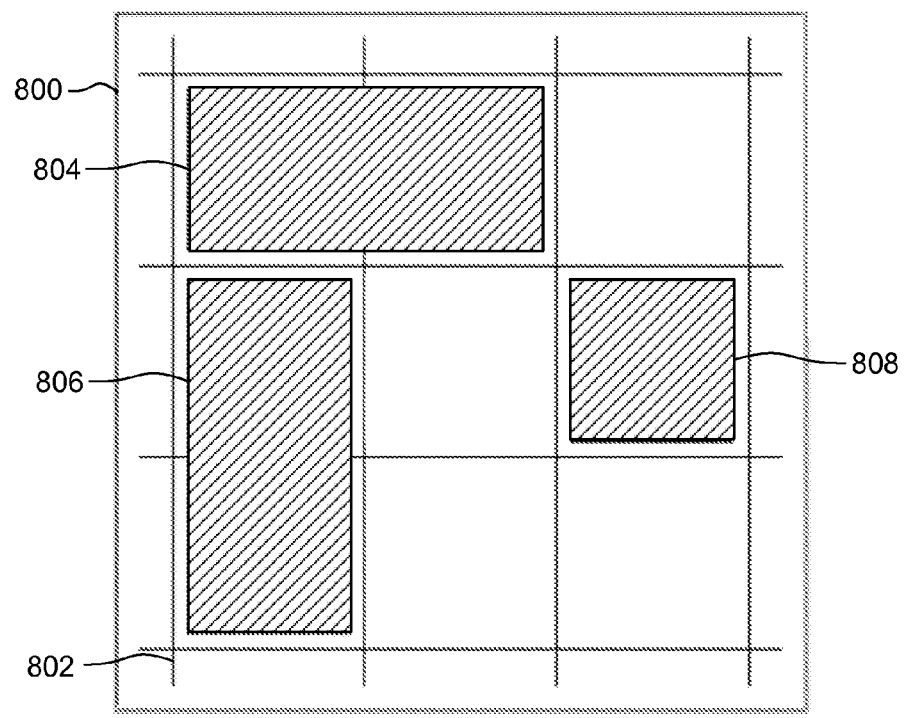
Figure 8I:
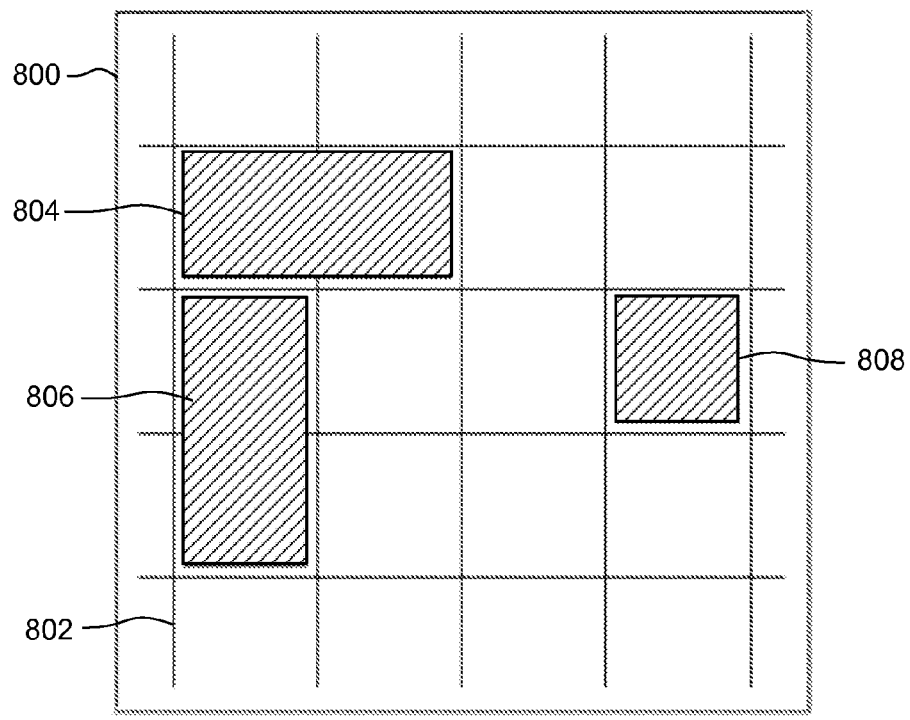

In FIG. 8H, graphical object 806 representing the second element has been resized (increased in size) and graphical object 808 representing the third element has been repositioned such that it occupies a different cell of grid 802. Grid 802 is once again scaled and resized such that the cells occupied by the elements represented by graphical objects 804, 806, and 808 fall within the bounds of collection graphical object 800. In FIG. 8I, graphical object 808 representing the third element has been repositioned to a further right position. Grid 802 is once again scaled and resized such that the cells occupied by the elements represented by graphical objects 804, 806, and 808 fall within the bounds of collection graphical object 800. When compared to FIG. 8H it can be seen that the size of the cells of grid 802 have been reduced due to scaling down of grid 802 in order to fit the repositioned graphical object 808.

Figure 8J:
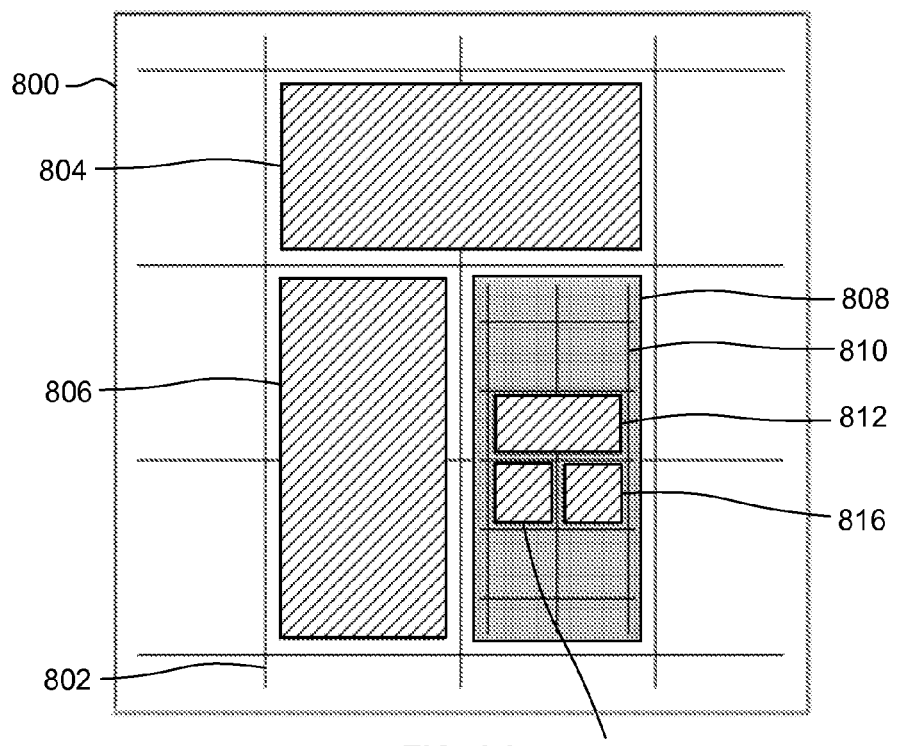

FIG. 8J depicts a scenario representing a collection (first collection) comprising three elements, one of which is another collection (a second collection) comprising three elements. A graphical object 800 with grid 802 is drawn representing the first collection. Graphical objects 804, 806, and 808 are drawn representing the three elements of the first collection with graphical object 808 representing the element which is the second collection. A grid 810 is associated with graphical object 808. Graphical objects 812, 814, and 816 representing the three elements of the second collection are displayed within the bounds of graphical object 808 representing the second collection. Grid 810 is scaled and resized such that the cells occupied by the elements represented by graphical objects 812, 814, and 816 fall within the bounds of collection graphical object 808.

Figure 8K:
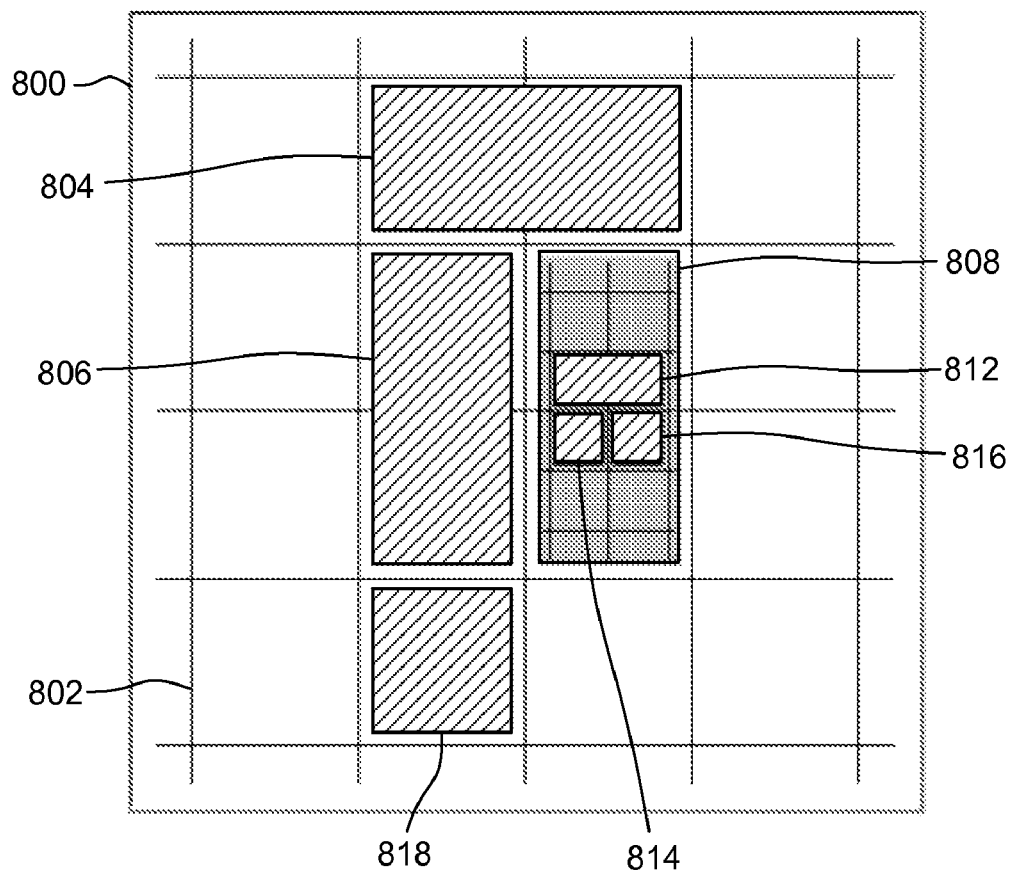

In FIG. 8K, a fourth element has been added to the first collection represented in FIG. 8J. A new graphical object 818 representing the fourth element is now displayed within the bounds of graphical object 800. Grid 802 is scaled and resized such that the cells occupied by the elements represented by graphical objects 804, 806, 808, and 818 fall within the bounds of collection graphical object 800.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented using hardware, software, or combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claim.

What is claimed is:

1. A method of displaying information for a collection comprising a plurality of elements, the method comprising:

displaying, by a computer system a first graphical object representative of a first collection, the first graphical object having an associated first bounds defining an area of a certain shape and size and a grid of tiled cells on a 2-dimensional plane, wherein at least one element in the plurality of elements is associated with more than one cell of the grid; and displaying, by the computer system a graphical object for each element in the plurality of elements of the first collection such that the graphical object for an element is displayed based upon one or more cells of the grid associated with the element represented by the graphical object, wherein the displaying comprises scaling and positioning the grid such that all graphical objects representing the elements of the first collection are displayed within the area defined by the first bounds of the first graphical object;

wherein positioning the grid comprises positioning the grid such that a centroid of a span of cells of the grid associated with the plurality of elements is same as a centroid of the first graphical object.

2. The method of claim 1 wherein scaling the grid comprises scaling the grid such that all graphical objects representing the elements of the first collection are displayed as large as possible.

3. The method of claim 1 wherein a second bounds is associated with the first graphical object, wherein an area defined by the second bounds is within the area defined by the first bounds of the first graphical object and the graphical objects representing the plurality of elements of the first collection are displayed within the second bounds.

4. The method of claim 1 wherein an element of the first collection is a second collection.

5. The method of claim 4 wherein an element of the second collection is a third collection, the third collection comprising a plurality of elements.

6. The method of claim 1 wherein a first cell of the grid is associated with a first element in the plurality of elements and a second element in the plurality of elements.

7. The method of claim 1 wherein the scaling and positioning comprises scaling and positioning the grid such that all cells of the grid associated with the plurality of elements of the first collection are positioned within the first bounds of the first graphical object.

8. The method of claim 1 wherein displaying a graphical object for each element in the plurality of elements comprises:

determining, for at least one element from the plurality of elements, a set of cells of the grid that are associated with the at least one element; and displaying the graphical object representing the at least one element in a position corresponding to the set of cells of the grid.

9. The method of claim 8 further comprising determining a minimum bounding box based upon the set of cells.

10. The method of claim 1 further comprising displaying the grid associated with the first graphical object.

11. The method of claim 1 wherein at least one element in the plurality of elements of the first collection is a second collection comprising a set of one or more elements, the method further comprising:

displaying a graphical object for each element in the second collection such that the graphical object for an element is displayed based upon one or more cells of a grid of the graphical object representing the second collection that are associated with the element represented by the graphical object, wherein the displaying comprises scaling and positioning the grid associated with the graphical object representing the second collection such that all graphical objects representing the elements of the second collection are displayed within an area defined by a bounds associated with the graphical object representing the second collection.

12. The method of claim 1 further comprising:
receiving information indicative of addition of a new element to the first collection;
scaling and positioning the grid such that all cells of the grid associated with the plurality of elements of the first collection, including the new element, are positioned within the first bounds of the first graphical object representing the first collection; and
redisplaying a graphical object for each element in the plurality of elements of the first collection such that the graphical object for an element is displayed in a position corresponding to the one or more cells of the grid associated with the element and the graphical objects representing the plurality of elements of the first collection are displayed within the first bounds of the first graphical object.

13. The method of claim 1 further comprising:
receiving information indicative of deletion of an element from the first collection;
scaling and positioning the grid such that all cells of the grid associated with the plurality of elements of the first collection, excluding the deleted element, are positioned within the first bounds of the first graphical object representing the first collection; and
redisplaying a graphical object for each element in the plurality of elements of the first collection such that the graphical object for an element is displayed in a position corresponding to the one or more cells of the grid associated with the element and the graphical objects representing the plurality of elements of the first collection are displayed within the first bounds of the first graphical object.

14. The method of claim 1 further comprising:
receiving information indicative of a change in size or position of a graphical object representing a first element in the first collection;
scaling and positioning the grid such that all cells of the grid associated with the plurality of elements of the first collection, including the first element, are positioned within the first bounds of the first graphical object representing the first collection; and
redisplaying a graphical object for each element in the plurality of elements of the first collection such that the graphical object for an element is displayed in a position corresponding to the one or more cells of the grid associated with the element and the graphical objects representing the plurality of elements of the first collection are displayed within the first bounds of the first graphical object.

15. The method of claim 1 wherein the cells of the grid are of same size and shape.

16. A system for displaying information for a collection comprising a plurality of elements, the system comprising:
a processor; and
a display;
wherein the processor is configured to:
cause a first graphical object representing a first collection to be displayed on the display, the first graphical object having an associated first bounds defining an area of a certain shape and size and a grid of tiled cells on a 2-dimensional plane, wherein at least one element in the plurality of elements is associated with more than one cell of the grid;
cause a graphical object to be displayed on the display for each element in the plurality of elements of the first collection such that the graphical object for an element is displayed based upon one or more cells of the grid associated with the element represented by the graphical object, wherein the displaying comprises scaling and positioning the grid such that all graphical objects representing the elements of the first collection are displayed within the area defined by the first bounds of the first graphical object; and
position the grid such that a centroid of a span of cells of the grid associated with the plurality of elements is same as a centroid of the first graphical object.

17. The system of claim 16 wherein the processor is configured to scale the grid such that all graphical objects representing the elements of the first collection are displayed as large as possible.

18. The system of claim 16 wherein a second bounds is associated with the first graphical object, wherein an area defined by the second bounds is within the area defined by the first bounds of the first graphical object and the graphical objects representing the plurality of elements of the first collection are displayed within the second bounds.

19. The system of claim 16 wherein an element of the first collection is a second collection.

20. The system of claim 16 wherein a first cell of the grid is associated with a first element in the plurality of elements and a second element in the plurality of elements.

21. The system of claim 16 wherein the processor is configured to scale and position the grid such that all cells of the grid associated with the plurality of elements of the first collection are positioned within the first bounds of the first graphical object.

22. The system of claim 16 wherein the processor is configured to:
determine, for at least one element from the plurality of elements, a set of cells of the grid that are associated with the at least one element; and
display the graphical object representing the at least one element in a position corresponding to the set of cells of the grid.

23. The system of claim 22 wherein the processor is configured to determine a minimum bounding box based upon the set of cells.

24. The system of claim 16 wherein the processor is configured to display the grid associated with the first graphical object.

25. The system of claim 16 wherein at least one element in the plurality of elements of the first collection is a second collection comprising a set of one or more elements, and the processor is configured to:
cause a graphical object to be displayed on the display for each element in the second collection such that the graphical object for an element is displayed based upon one or more cells of a grid of the graphical object representing the second collection that are associated with the element represented by the graphical object, wherein the displaying comprises scaling and positioning the grid associated with the graphical object representing the second collection such that all graphical objects representing the elements of the second collection are displayed within an area defined by a bounds associated with the graphical object representing the second collection.

26. The system of claim 16 wherein the processor is configured to:
- receive information indicative of addition of a new element to the first collection;
- scale and position the grid such that all cells of the grid associated with the plurality of elements of the first collection, including the new element, are positioned within the first bounds of the first graphical object representing the first collection; and
- cause a graphical object to be redisplayed on the display for each element in the plurality of elements of the first collection such that the graphical object for an element is displayed in a position corresponding to the one or more cells of the grid associated with the element and the graphical objects representing the plurality of elements of the first collection are displayed within the first bounds of the first graphical object.

27. The system of claim 16 wherein the processor is configured to:
- receive information indicative of deletion of an element from the first collection;
- scale and position the grid such that all cells of the grid associated with the plurality of elements of the first collection, excluding the deleted element, are positioned within the first bounds of the first graphical object representing the first collection; and
- cause a graphical object to be redisplayed on the display for each element in the plurality of elements of the first collection such that the graphical object for an element is displayed in a position corresponding to the one or more cells of the grid associated with the element and the graphical objects representing the plurality of elements of the first collection are displayed within the first bounds of the first graphical object.

28. The system of claim 16 wherein the processor is configured to:
- receive information indicative of a change in size or position of a graphical object representing a first element in the first collection;
- scale and position the grid such that all cells of the grid associated with the plurality of elements of the first collection, including the first element, are positioned within the first bounds of the first graphical object representing the first collection; and
- cause a graphical object to be redisplayed on the display for each element in the plurality of elements of the first collection such that the graphical object for an element is displayed in a position corresponding to the one or more cells of the grid associated with the element and the graphical objects representing the plurality of elements of the first collection are displayed within the first bounds of the first graphical object.

29. The system of claim 16 wherein the cells of the grid are of same size and shape.

30. A computer readable medium storing a plurality of instructions for controlling a processor to display information, the plurality of instructions comprising:
- instructions that cause the processor to display a first graphical object representative of a first collection comprising a plurality of elements on a display, the first graphical object having an associated first bounds defining an area of a certain shape and size and a grid of tiled cells on a 2-dimensional plane, wherein at least one element in the plurality of elements is associated with more than one cell of the grid;
- instructions that cause the processor to display on the display a graphical object for each element in the plurality of elements of the first collection such that the graphical object for an element is displayed based upon one or more cells of the grid associated with the element represented by the graphical object, wherein the displaying comprises scaling and positioning the grid such that all graphical objects representing the elements of the first collection are displayed within the area defined by the first bounds of the first graphical object; and
- instructions that cause the processor to position the grid such that a centroid of a span of cells of the grid associated with the plurality of elements is same as a centroid of the first graphical object.

* * * * *